(12) United States Patent
Wong et al.

(10) Patent No.: US 11,846,579 B2
(45) Date of Patent: Dec. 19, 2023

(54) SYSTEMS AND METHODS FOR COUNTING CELLS

(71) Applicant: Thrive Bioscience, Inc., Beverly, MA (US)

(72) Inventors: Kam Lin Wong, Bedford, MA (US); Melanie Scully, Beverly, MA (US)

(73) Assignee: Thrive Bioscience, Inc., Beverly, MA (US)

(*) Notice: Subject to any disclaimer, the term of this patent is extended or adjusted under 35 U.S.C. 154(b) by 604 days.

(21) Appl. No.: 16/614,495

(22) PCT Filed: May 18, 2018

(86) PCT No.: PCT/US2018/033395
§ 371 (c)(1),
(2) Date: Nov. 18, 2019

(87) PCT Pub. No.: WO2018/213709
PCT Pub. Date: Nov. 22, 2018

(65) Prior Publication Data
US 2020/0072730 A1    Mar. 5, 2020

Related U.S. Application Data

(60) Provisional application No. 62/508,953, filed on May 19, 2017.

(51) Int. Cl.
*G01N 15/14*    (2006.01)
*G01N 1/30*    (2006.01)
(Continued)

(52) U.S. Cl.
CPC ............ *G01N 15/1434* (2013.01); *B01L 9/00* (2013.01); *G01N 1/30* (2013.01); *G01N 15/1468* (2013.01);
(Continued)

(58) Field of Classification Search
None
See application file for complete search history.

(56) References Cited

U.S. PATENT DOCUMENTS 6,350,613 B1    2/2002  Wardlaw et al.
2008/0019584 A1*    1/2008  Lindberg ............ G06T 7/0012
                                                                    382/134
(Continued)

FOREIGN PATENT DOCUMENTS

CN    101490529 A    7/2009
CN    102439416 A    5/2012
(Continued)

OTHER PUBLICATIONS

PCT/US2018/033395, Aug. 24, 2018, International Search Report and Written Opinion.
(Continued)

*Primary Examiner* — P. Kathryn Wright
(74) *Attorney, Agent, or Firm* — Wolf, Greenfield & Sacks, P.C.

(57) ABSTRACT

According to at least one aspect, a system configured to count cells in a vessel is provided. The system comprises an imaging system configured to image cells in the vessel and a controller coupled to the imaging system. The controller is configured to control the imaging system to capture a focused image of the cells and estimate a number of cells in the focused image. The controller is configured to control the imaging system to capture a focused image of the cells at least in part by controlling the imaging system to capture a plurality of images of the cells in a plurality of focal planes, determining an area of at least one cell in each of the plurality of images, and selecting one image from the plurality of images as the focused image using the area of the at least one cell in the plurality of images.

16 Claims, 7 Drawing Sheets

(51) Int. Cl.
  *B01L 9/00* (2006.01)
  *G02B 21/36* (2006.01)
  *G06V 20/69* (2022.01)
  *G01N 15/10* (2006.01)
  *B41M 3/00* (2006.01)

(52) U.S. Cl.
  CPC ......... *G02B 21/365* (2013.01); *G06V 20/693* (2022.01); *G06V 20/695* (2022.01); *B01L 2200/18* (2013.01); *B01L 2300/18* (2013.01); *B41M 3/003* (2013.01); *G01N 2001/302* (2013.01); *G01N 2015/1006* (2013.01); *G01N 2015/1445* (2013.01); *G01N 2015/1486* (2013.01)

(56) References Cited

U.S. PATENT DOCUMENTS

| | | | |
|---|---|---|---|
| 2009/0068728 | A1 | 3/2009 | Kiyota et al. |
| 2012/0013727 | A1* | 1/2012 | Breniman ............ G06V 20/693 |
| | | | 348/E5.045 |
| 2012/0295300 | A1* | 11/2012 | Heng ...................... C12Q 1/02 |
| | | | 435/39 |
| 2014/0024107 | A1 | 1/2014 | McCollum et al. |
| 2017/0091948 | A1* | 3/2017 | Paradkar ................ G06T 7/60 |
| 2017/0228865 | A1* | 8/2017 | Cohen .................. G06T 7/0012 |
| 2017/0254741 | A1 | 9/2017 | Suganuma et al. |
| 2018/0240239 | A1* | 8/2018 | Wang ........................ G06T 7/11 |
| 2022/0120664 | A1* | 4/2022 | Rognin ................ G06V 20/693 |

FOREIGN PATENT DOCUMENTS

| | | | |
|---|---|---|---|
| CN | 102576406 | A | 7/2012 |
| CN | 104266955 | A | 1/2015 |
| CN | 105143850 | A | 12/2015 |
| CN | 105190400 | A | 12/2015 |
| JP | 2003-323600 | A | 11/2003 |
| JP | 2009-544035 | A | 12/2009 |
| JP | 2013-503351 | A | 1/2013 |
| WO | WO 2007/145091 | A | 12/2007 |
| WO | WO 2008/010761 | A1 | 1/2009 |
| WO | WO 2011/026029 | A1 | 3/2011 |
| WO | WO 2012/166952 | A1 | 12/2012 |
| WO | WO 2016/080442 | A1 | 5/2016 |
| WO | WO-2017067868 | A1 * | 4/2017 ............... G06T 7/10 |

OTHER PUBLICATIONS

PCT/US2018/033395, Nov. 28, 2019, International Preliminary Report on Patentability.
International Search Report and Written Opinion dated Aug. 24, 2018 in connection with Application No. PCT/US2018/033395.
International Preliminary Report on Patentability dated Nov. 28, 2019 in connection with Application No. PCT/US2018/033395.
[No Author Listed], New development of communication theory and technology in 2008—13th National Youth Communication Conference of China Proceedings (the last volume). National Defense Industry Press, ed. Dec. 31, 2008; 1120-3.

* cited by examiner

SYSTEMS AND METHODS FOR COUNTING CELLS

CROSS REFERENCE TO RELATED APPLICATIONS

This Application is a national stage filing under 35 U.S.C. 371 of International Application No. PCT/US2018/033395, filed on May 18, 2018, which claims the benefit under 35 U.S.C. § 119(e) to U.S. Provisional Application Serial No. 62/508,953, entitled "SYSTEMS AND METHODS FOR COUNTING CELLS," and filed on May 19, 2017. The entirety of each of the applications listed above is herein incorporated by reference.

FIELD

Aspects of the technology described herein relate to techniques for automatically counting cells in a vessel. Some aspects relate to implementation of these techniques in automated cell counters and cell culture incubators.

BACKGROUND

Certain scientific experiments may require a cell culture with a minimum concentration (e.g., 1,300,000 cells per milliliter) and/or a minimum number of cells (e.g., 10,000,000 cells). For these experiments, a manual cell count is typically performed using a hemocytometer to confirm that the cell culture being used for the experiment contains a sufficient concentration and/or number of cells. The hemocytometer may have a chamber with grid lines forming boxes of a predetermined size that is configured to receive, for example, a sample from the cell culture. An operator may view the hemocytometer under a microscope and count a number of cells in one or more boxes formed by the grid lines. Thereby, the operator may use the number of manually counted cells in combination with the known size of the box(es) to identify a concentration of cells in the sample. The total number of cells in the sample may be identified by multiplying the identified concentration of cells by the size (e.g., volume) of the sample.

SUMMARY

According to at least one aspect, a system is provided. The system comprises an imaging system configured to image a plurality of cells in a vessel in a plurality of focal planes and at least one controller coupled to the imaging system. The at least one controller is coupled to memory containing instructions that when executed: control the imaging system to capture a plurality of images of at least some cells, each of the plurality of images being captured in a respective focal plane of the plurality of focal planes, determine an area of at least one cell from the at least some cells in each of the plurality of images, select one image from the plurality of images as the focused image using the area of the at least one cell in at least some of the plurality of images, and estimate a number of cells in the focused image.

According to at least one aspect, a method is provided. The method comprises receiving a plurality of cells in a vessel, capturing a focused image of at least some cells in the plurality of cells, and estimating, using the at least one controller, a number of cells in the focused image. Capturing the focused image of at least some cells in the plurality of cells comprises capturing a plurality of images of the at least some cells using the imaging system, each of the plurality of images being captured in a respective focal plane of a plurality of focal planes, determining, using at least one controller, an area of at least one cell from the at least some cells in each of the plurality of images, and selecting, using the at least one controller, one image from the plurality of images as the focused image using the area of the at least one cell in at least some of the plurality of images.

According to at least one aspect, an automated cell counter. The automated cell counter comprises a vessel mount configured to receive a vessel housing a plurality of cells, an imaging system configured to image the plurality of cells in a plurality of focal planes, and at least one controller coupled to the imaging system. The at least one controller is coupled to memory containing instructions that when executed: control the imaging system to capture a plurality of images of at least some cells, each of the plurality of images being captured in a respective focal plane of the plurality of focal planes, determine an area of at least one cell from the at least some cells in each of the plurality of images, select one image from the plurality of images as the focused image using the area of the at least one cell in at least some of the plurality of images, and estimate a number of cells in the focused image.

According to at least one aspect, a system is provided. The system comprises an imaging system configured to image a plurality of cells in a vessel and at least one controller coupled to the imaging system. The at least one controller is coupled to memory containing instructions that when executed: control the imaging system to capture a focused image of at least some cells in the plurality of cells and estimate a number of cells in the focused image at least in part by: identifying a plurality of objects in the focused image, classifying a subset of the plurality of objects as cells, and counting a number of cells in the subset of the plurality of objects classified as cells.

According to at least one aspect, a cell culture incubator is provided. The cell culture incubator comprises an incubator cabinet configured to receive a vessel storing a plurality of cells, an imaging system configured to image the plurality of cells, and at least one controller coupled to the imaging system. The at least one controller is coupled to memory containing instructions that when executed: control the imaging system to capture a plurality of images of at least some cells, each of the plurality of images being captured in a respective focal plane of the plurality of focal planes, determine an area of at least one cell from the at least some cells in each of the plurality of images, select one image from the plurality of images as the focused image using the area of the at least one cell in at least some of the plurality of images, and estimate a number of cells in the focused image.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
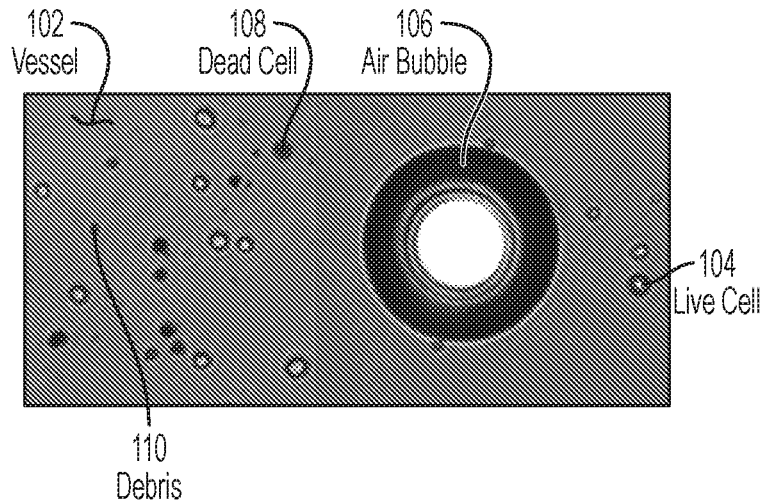
FIG. 1A is a diagram illustrating a top view of a vessel housing cells, according to some embodiments of the technology described herein.
Figure 1B:
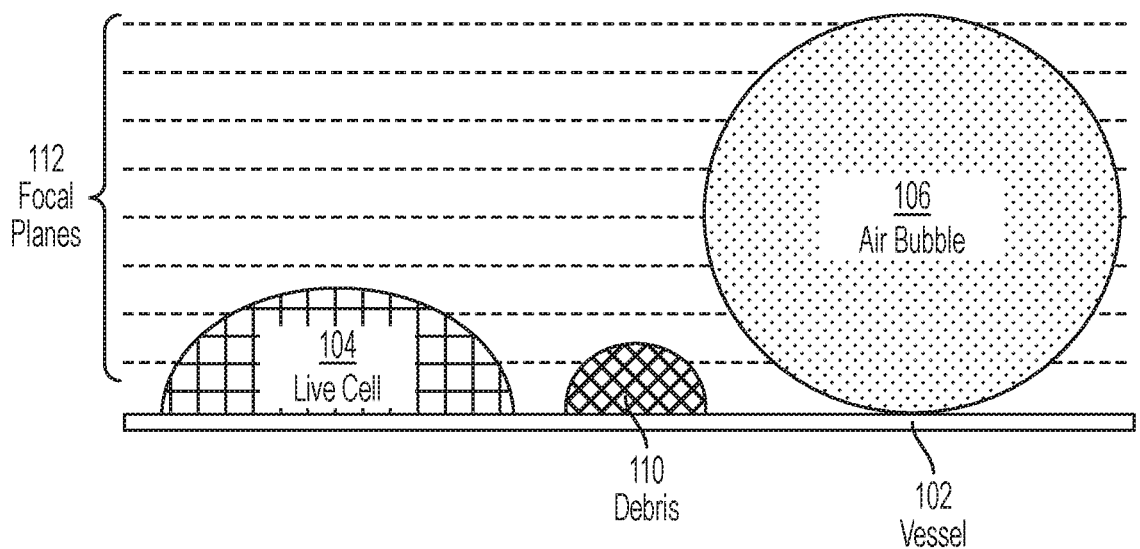
FIG. 1B is a diagram illustrating a cross-sectional view of a vessel housing cells, according to some embodiments of the technology described herein.

As discussed above, a cell concentration and/or cell count of cells in a cell culture may need to be identified for certain experiments. Conventionally, an operator may count the number of cells in a cell culture by taking a representative sample from the culture and counting a number of cells in the sample. Given the small size of the individual cells, an operator typically places the sample in a vessel (such as a hemocytometer) and views the vessel (including the cells) under a microscope. The operator, however, typically will see foreign elements in the sample such as air bubbles and/or debris. Thereby, an operator typically must visually differentiate between the cells in the sample and the foreign elements. An example view of a sample in a vessel that may be seen by an operator is shown in FIG. 1A. As shown, the view includes a live cell 104, an air bubble 106, a dead cell 108, and debris 110 on a surface of a vessel 102. Further, an operator typically must properly focus the microscope on the live cell 104 to obtain such a view of the sample as shown in FIG. 1A. Given the small size of the live cell 104, the operator may not be able to see the live cell 104 if the focus of the microscope is off by ten microns. FIG. 1B shows a cross-sectional view of the vessel 102 housing a sample and an example set of focal planes 112 may be selected by the operator. As shown, most of the focal planes in the set of focal planes 112 do not intersect the live cell 104.

The inventor has appreciated that manually counting cells in a vessel (such as a hemocytometer) is a time-consuming process that typically requires the judgement of a lab technician and is subject to human error. For example, a human may select an incorrect focal plane where certain types of debris appear similar to live cells and include the debris in a total cell count. Further, under-counting and/or over-counting the number of cells in a cell culture may cause a scientist to use an inappropriate cell culture for an experiment, which may cause the experiment to fail. Accordingly, aspects of the present disclosure relate to techniques for automatically counting cells in a vessel. For example, the resulting cell counts produced by use of these techniques may be produce counts that deviate by no more than ±5% from manual counts. These techniques improved upon conventional cell counting techniques by providing a fast and accurate way to count cells (e.g., cells in a cell culture), which reduces human error and promotes the completion of successful experiments.

The inventor has appreciated that analyzing an image of cells captured in an incorrect focal plane (e.g., a plane where the cells are not in-focus) may have a detrimental impact on the accuracy of the resulting cell count. Accordingly, the inventor has devices new techniques to identify a focal plane (or, equivalently, focal length) such that the cells are in-focus. The inventor has appreciates that the area of the cells may vary based on the selected focal plane. For example, the edges of the cells may appear blurry in a focal plane when the cells are not in-focus and, thereby, make the cells appear larger. Conversely, the edges of the cells may appear crisp in a focal plane where the cells are in-focus and, thereby, make the cells appear smaller. Thereby, the focal plane in which the cells are in-focus may be the focal plane in which the area of the cells is at a minimum.

Once the proper focal plane is identified, one or more image processing techniques, devised by the inventor, may be employed to estimate the number of cells in the focused image. For example, one or more objects may be identified in the focused image. These objects may be, for example, continuous regions of pixels in a foreground of the image. Once the objects have been identified, one or more features may be identified for one or more of the objects, such as size and/or shape, and used to classify the object. The object may be classified as, for example, live cell(s), dead cell(s), or debris based on one or more features of the objects. Once the objects are classified, the number of objects that are classified as cells (e.g., live cells or dead cells) may be counted to estimate the total number of cells in the focused image.

Some aspects of the technology described herein relate to a system (such as an automated cell counter or a cell culture incubator) that is configured to automatically count cells in a vessel. The vessel may be configured to receive cells in a fluid. Example vessels include flasks, bottles, bags, and plates. The system may comprise an imaging system that is configured to image a plurality of cells in the vessel in a plurality of focal planes. The imaging system may be implemented as, for example, a microscope (e.g., a bright-field microscope). The imaging system may comprise an imaging configured to detect light and one or more optical elements to change a characteristic of light (e.g., lenses, mirrors, light filters, and light sources). The system may comprise a controller that is coupled (e.g., communicatively coupled) to the imaging system. The controller may be implemented using, for example, a processor coupled to memory and/or non-volatile storage. The controller may be configured to control the imaging system to capture a focused image (e.g., a focused bright-field image) of a plurality of cells using the imaging system. For example, the controller may send an instruction to the imaging system to trigger the imaging system to capture a plurality of images in different focal planes (or, equivalently, focal lengths). Such a plurality of images may be termed a "Z stack" as it may include two-dimensional (x-y) images at different focal lengths (different "z" coordinates) relative to an imaging device (e.g., a camera) in the imaging system. Then, the controller may analyze the plurality of images captured in different focal planes to identify which image in the plurality of images is a focused image. The identified image may be termed as a focused images because, in some embodiments, the image if identified from the plurality of images based on a quantitative estimate of how "focused" the image may be. For example, the image in the plurality of images that is the focused image may have the smallest area of cells. Thereby, the focused image may be selected by, for example, determining an area of at least one cell in each of the plurality of images and selecting one image from the plurality of images as the focused image with a smallest area of the cell.

Once the focused image is identified, the controller may be configured to estimate a number of cells (e.g., live cells, dead cells, or a combination thereof) in the focused image. For example, the controller may be configured to identify a plurality of objects in the focused image and classify the objects in the focused image as, for example, a live single cell, a live cell cluster, a dead cell, or debris. Once the objects have been classified, the number of live cells (e.g. viable cells) may be estimated by counting the number of objects classified as live cells (e.g., live single cells and live cell clusters). Similarly, the number of dead cells may be identified by counting the number of objects classified as dead cells. Further, the total number of cells may be identified by combining the number of dead cells with the number of live cells. The controller may be configured classify objects in any of a variety of ways. For example, the controller may classify an object by identify one or more features of object and providing the one or more features as input to a classifier. The classifier may be configured (e.g., trained) to provide an indication of which class the object belongs based on the input features. Example classifiers that may be employed include: a decision tree, a neural network, a discriminant function, a Bayesian network, and a support vector machine.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 2:
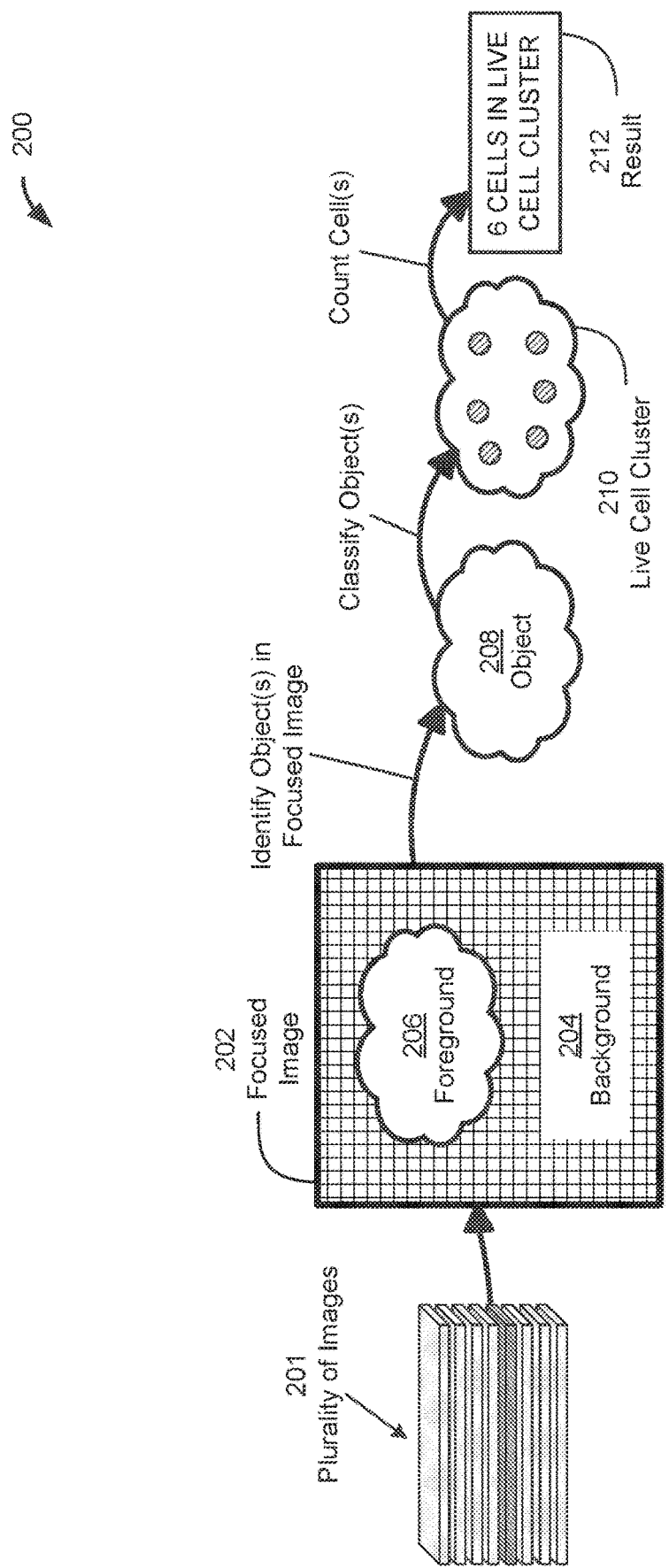
FIG. 2 is a diagram illustrating an example process for counting cells in an image, according to some embodiments of the technology described herein.

As discussed above, the number of cells in a vessel may be counted by capturing a focused image of the cells in the vessel and analyzing the focused image using automated image processing technique(s). FIG. 2 is a diagram showing an example process 200 that may be performed to estimate a number of cells in a vessel. The process 200 may be performed by any of a variety of systems including, for example, a cell culture incubator (e.g., cell culture incubator 400) or an automated cell counter (e.g., automated cell counter 500). As shown, a plurality of images 201 in different focal planes may be captured of the cells in the vessel. Then, a focused image 202 may be selected from the plurality of images 201 and a foreground 206 of the focused image 202 may be separated from a background 204 of the focused image 204—with a goal of the foreground 206 including the parts of the image that contain cells and the background 204 include the parts of the image that do not contain cells. Once the foreground 206 has been separated from the background 204, an object 208 may be identified in the focused image 202 (e.g., in the foreground 206) that may be classified (e.g., classified as a live cell cluster 210). Once the object 208 has been classified, the number of cells in the object 208 may be counted.

The plurality of images 201 may be captured in a plurality of different focal planes (e.g., the plurality of images 201 may be a Z stack). The focal planes may be spaced evenly (e.g., each focal plane is separated by two microns) or unevenly (e.g., some focal planes are separated by one micron while others are separated by three microns). The plurality of images 201 may be, for example, bright-field images captured by an imaging system such as imaging 600A or 600B shown in FIGS. 6A and 6B, respectively.

The focused image 202 may be selected from the plurality of images 201 by analyzing an area of the cells in each of the plurality of images. For example, the area of the cells may be smallest in the focused image and smaller in the remaining images. Thereby, the focused image may be selected by selecting an image from the plurality of images with a smallest area of the cells (or conversely a largest non-cell area). The area of the cells in an image may be identified in any of a variety of ways. In some embodiments, the area of the cells may be identified for each of the images in the plurality of images 201 by: (1) separating the background 204 from the foreground 206, (2) identifying objects in the foreground 206 that are within certain dimensions (e.g., the typical dimensions of a single cell), and (3) adding up the area of the objects.

The background 204 may be segmented from the foreground 206 in the focused image using edge detection techniques, such as applying one or more thresholds to the focused image 202. The threshold may separate pixels based on their intensity value. For example, pixels that have an intensity value below the threshold may be classified as foreground 206 and pixels that have an intensity value above the threshold may be classified as background 204. Any of a variety of methods may be employed to identify the particular threshold to use as is appreciated by those of skill in the art. For example, the threshold may be identified using the Otsu thresholding method. It should be appreciated that more than a single threshold may be employed to separate the foreground 206 from the background 204. For example, the image may be subdivided into a plurality of sections and a separate threshold may be identified for each of the plurality of sections to separate the background 204 from the foreground 206. In some embodiments, the result of the segmentation of the background 204 from the foreground 206 may be represented by a mask such as, for example, a binary mask that indicates for each pixel in an image whether that pixel belongs in the foreground 206 or the background 204.

In some embodiments, one or more acts may be performed after thresholding the image to complete the mask. For example, the thresholding operation may have classified the center of live cells as background 204 because of their light color. Thereby, only the outer edge of the live cells may be classified as part of the foreground 206. In this example, the holes in the middle of areas in the foreground 206 may be added to the mask (e.g., re-classified as foreground). Additionally (or alternatively), artifacts that were initially detected as part of the foreground 206 may be moved to the background 204 and/or removed from the focused image 202 altogether. For example, groups of pixels in the foreground 206 that have fewer than a threshold number of pixels (e.g., 5 pixels, 10 pixels, etc.) are likely artifacts and may be moved to the background 204. In another example, a smoothing filter may be applied to the focused image 202 (or just the foreground 206) that reduces the pixel-to-pixel intensity variation. Large intensity changes between two neighboring pixels is likely caused by noise and, thereby, may be reduced.

The object 208 may be identified in the focused image 206 by, for example, identifying continuous regions of pixels in the foreground 204 (e.g., as indicated by the mask) as objects. Once the object 208 has been identified, the object 208 may be classified by, for example, identifying one or more features of the object 208 and providing the identified features of the object 208 as input to a classifier. Example features of the object 208 that may be identified include morphological features, light intensity features, and texture features. Morphological features may relate to, for example, the size and/or shape of the object 208. Light intensity features may relate to, for example, characteristics of the intensity values of pixels that comprise the object 208. Texture features may relate to, for example, an appearance of a surface and/or a cross-section of the object 208. Once the features of the object 208 are identified, these features may be used as an input to a classifier that is configured (e.g., trained) to distinguish between different classes of objects. Example classifiers that may be employed include: a decision tree, a neural network, a discriminant function, a Bayesian network, and a support vector machine. The output of the classifier may be an indication of which class the object 208 belongs. For example, the output of the classifier may indicate whether the object 208 is a single live cell, a cluster of cells, dead cell(s), or an artifact. It should be appreciated that the particular set of classes which the classifier may be configured to distinguish between may vary based on the particular implementation.

The result 212 may be generated by, for example, counting a number of objects 208 classified as cells. In some embodiments, a classified object may contain more than a single cell (e.g., the live cell cluster 210) and the number of cells within the classified object may be counted to add to the total number of cells. The number of cells within the live cell cluster 210 may be identified by, for example, analyzing an intensity contour associated with the live cell cluster 210. The center of the cells in the live cell cluster 210 may appear to be a bright spot in the image. The bright spot may appear as a sharp peak in the intensity contour at the center of each cell in the live cell cluster 210. Thereby, the number of peaks in the intensity contour of the live cell cluster 212 may be counted to identify the number of cells in the live cell cluster 210.

Figure 3:
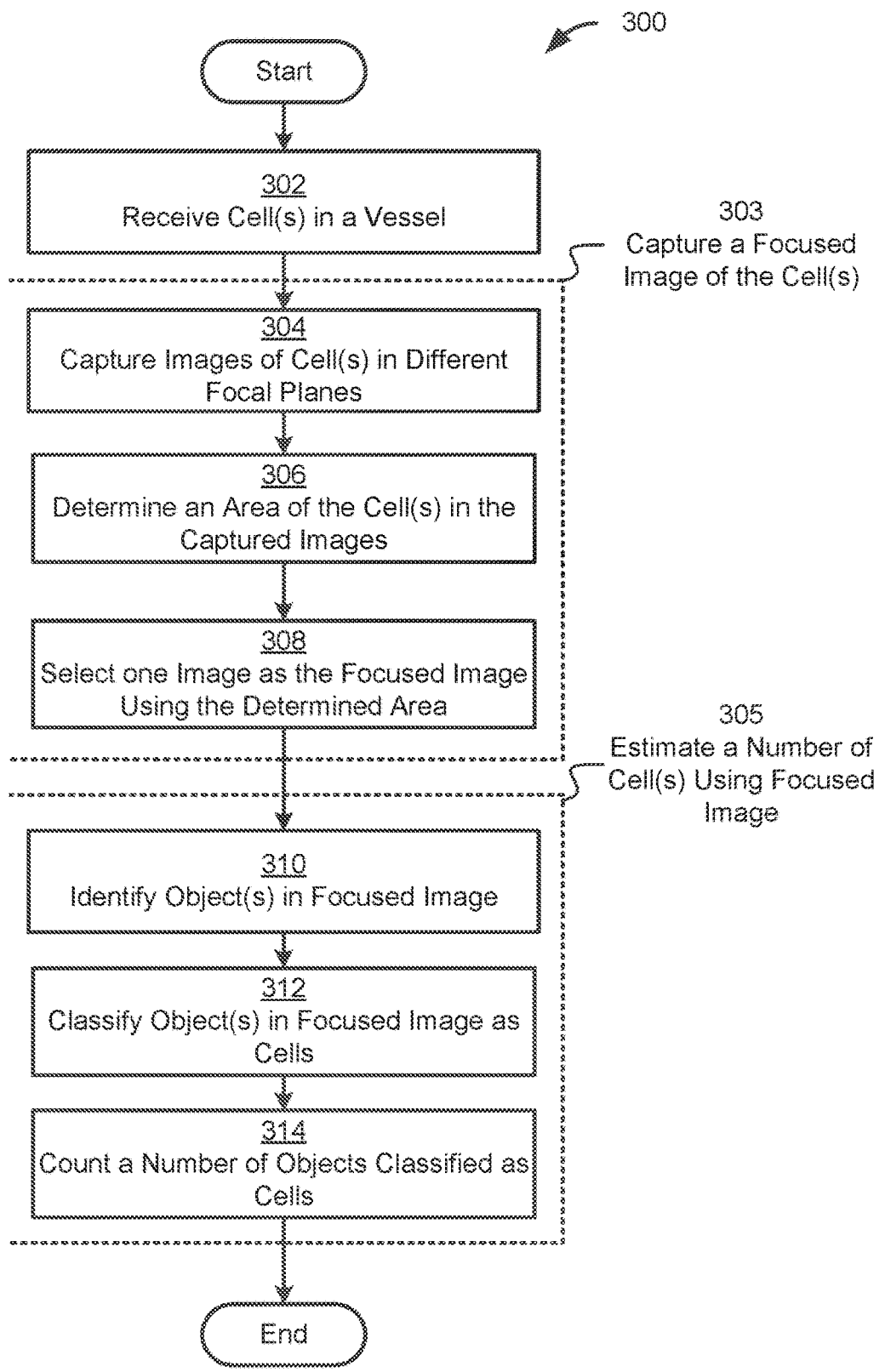
FIG. 3 is a flowchart of an example process for counting cells in a vessel, according to some embodiments of the technology described herein.

FIG. 3 shows an example process 300 for counting cells in a vessel. The process may be performed by a system comprising, for example, an imaging system that is configured to capture images of the cells in different focal planes and a controller that is coupled to the imaging system that is configured to analyze the captured images to analyze a focused image and estimate a number of cells in the focused image. The system may be implemented as a cell culture incubator or as an automated cell counter shown in FIGS. 4 and 5, respectively. As shown, the process 300 comprises an act 302 of receiving cell(s) in a vessel, an act 303 of capturing a focused image of the cell(s), and an act 305 of estimating a number of cell(s) using the focused image. The act 303 of capturing the focused image of the cell(s) may comprise an act 304 of capturing images of the cell(s), an act 306 of determining an area of the cell(s) in the captured images, and an act 308 of selecting one image as the focused image using the determined area. The act 305 of estimating a number of cell(s) using the focused image may comprise an act 310 of identifying objects in the focused image, an act 312 of classifying objects in the focused image, and an act 314 of counting a number of objects classified as cells in the focused image.

Figure 6A:
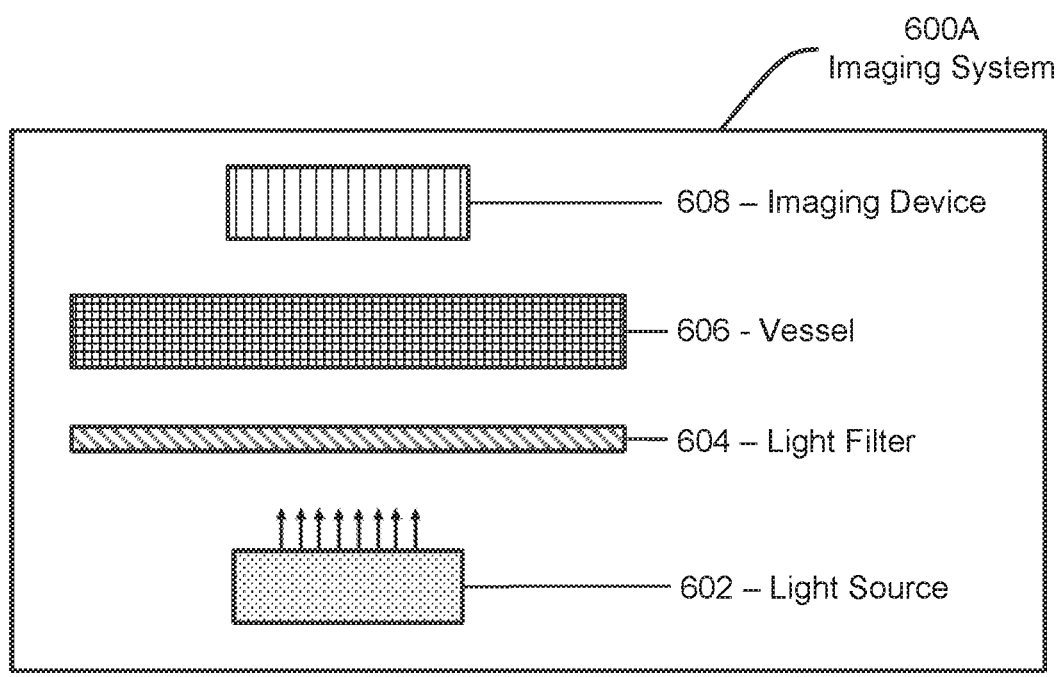
FIGS. 6A and 6B are diagrams illustrating example imaging systems, according to some embodiments of the technology described herein.
Figure 6B:
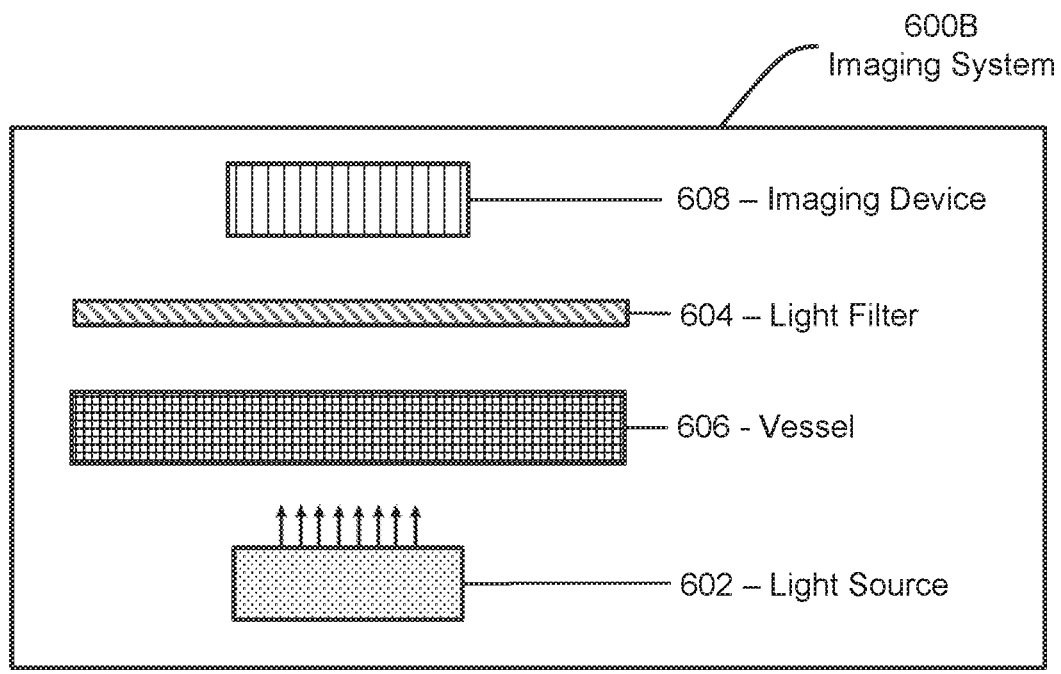

In act 302, the imaging system may receive cell(s) in a vessel. For example, the imaging system may receive the cell(s) at an imaging location (e.g., imaging location 405) such that the imaging system may capture images of the cell(s). In some embodiments, the cell(s) in the vessel may be exposed to an agent that selectively labels the dead cells. The agent may be, for example, a stain that selectively stains the dead cells such as trypan blue and propidium iodide. Labeling the dead cells using an agent may allow the controller to more easily distinguish the dead cells from the live cells by enhancing the contrast between them. Additionally (or alternatively), the imaging system may comprise a light filter to further enhance the contrast between the live cells and the dead cells. An example of such an imaging system is shown in FIGS. 6A and 6B.

In act 303, the controller may control the imaging system to capture a focused image (e.g., a focused bright-field image) of the cell(s) in the vessel. The focused image may be, for example, an image where the cells in the vessel are in-focus. The focused image may be captured in any of a variety of ways. An example process for capturing a focused image is shown in FIG. 3 by acts 304, 306, and 308.

In act 304, the controller may control the imaging system to capture a plurality of images of the cell(s) in a plurality of different focal planes (e.g., capture a Z stack). For example, the controller may control the imaging system to capture a plurality of bright-field images in the plurality of different focal planes. The plurality of focal planes may be evenly (or unevenly) spaced. In some embodiments, the plurality of focal planes may be selected based on the particular type(s) of cells being counted. For example, focal planes that are above the top of the cells being imaged may be omitted from the plurality of focal planes. In other embodiments, the plurality of focal planes may be a fixed set of focal planes that is used regardless of the type of cell being counted.

In act 306, the controller may determine an area of the cell(s) in the captured images. The area of the cell(s) in each of the images may be identified by, for example, identifying cells (e.g., single cells) in the images and estimating an area of the identified cells. The cells may be identified by separating the foreground from the background in each image and identifying objects in the foreground that have characteristics of a single cell (e.g., a shape, a size, and/or a color). For example, a global threshold may be applied to the entire image to separate bright pixels (background) from dark pixels (foreground). The global threshold may be identified using, for example, the Otsu thresholding algorithm. Once the global threshold has been applied, a local threshold may be applied to bounded regions (e.g., bounded rectangles) in the image that include a continuous set of dark pixels to fine-tune the delineation between the foreground and the background. The local threshold may be identified by, for example, using the average intensity of pixel values in the selected region as the threshold. Once the local threshold has been applied, areas of the background that are completely (or partially) surrounded by a continuous region of foreground pixels may be added to the foreground. The continuous regions in the resulting foreground may be identified as objects. The objects that have characteristics of a single cell (e.g., size, shape, and/or color) may be used in the calculation of the area of the cell(s). Other objects in the foreground may be ignored entirely and, thereby, filtered out. The area of the identified single cells may be estimated by, for example, counting a number of pixels associated with the identified single cells and/or estimating a length of an axis of the identified single cells.

In act 308, the controller may select one image from the plurality of images (e.g., captured in act 304) as the focused image using the determined areas of the cell(s). For example, the controller may select the image with the smallest area of the cells as the focused image. In some embodiments, the controller may repeat acts 304 and/or 306 if the selected image does not meet one or more predetermined requirements (e.g., the area is above a threshold). For example, the controller may determine that the best image in the plurality of images captured in act 304 is insufficient and repeat act 304 to capture a second plurality of images in a different set of focal planes (relative to the previous set of focal planes associated with the previous plurality of images). The area of the cell(s) in the second plurality of images may be identified in act 306 and the controller may select one image from the second plurality of images as the focused image in act 308.

In act 305, the controller may estimate a number of cell(s) in the focused image. The number of cells may be estimated using, for example, automated image processing techniques. An example process for estimating a focused image is shown in FIG. 3 by acts 310, 312, and 314.

In act 310, the controller may identify object(s) in the focused image. The controller may identify objects in the focused image by separating a background from a foreground of the focused image (e.g., in a similar or same fashion as described in act 306) and identifying continuous regions of pixels in the foreground (e.g., portions of the foreground) as objects. The background may be separated from the foreground using, for example, edge detection techniques (such as thresholding and/or iterative threshold).

In act 312, the controller may classify the identified objects in the focused image. The controller may classify an object by, for example, identifying one or more features of the object and providing the one or more features of the object as input to a classifier. The classifier may be configured (e.g., trained) to identify a class to which an object belongs based on the input features. The particular set of classes with which the classifier is configured to distinguish between may vary based on the particular implementation. Example classes include: a live single cell class, a live cell cluster class, dead single cell class, a dead cell cluster class, and a debris class.

The controller may identify any of a variety of features of an object to use for classification. Example features that may be identified include morphological features, light intensity features, and texture features. Morphological features may relate to, for example, the size and/or shape of the object. Example morphological features include: a contour area of the object, a convex hull area of the object, a ratio of contour area to convex hull area of the object, a roundness of the object, and a ratio of area of a bounding rectangle around the object to area of the object. Light intensity features may relate to, for example, characteristics of the intensity values of pixels that comprise the object. Example light intensity features include: an average pixel intensity value of brightest pixels (e.g., top 10 brightest pixels) in the object, grey value features of the object (e.g., sum, mean, standard deviation, and variance of the grey values of the object), and optical density features of the object (e.g., sum, mean, standard deviation, and variance of the optical density of the object). Texture features may relate to, for example, an appearance of a surface and/or a cross-section of the object. Example texture features include: an entropy of the object and a contrast of the object.

The controller may employ any of a variety of classifiers and/or classification techniques to classify the objects in the focused image. For example, a decision tree classifier may be used. As another example, a linear classifier (e.g., Fischer's linear discriminant classifier, logistic regression classifier, Naive Bayes classifier, probit regression classifier, etc.) may be used. As yet another example, a Bayesian classifier (e.g., a Bayesian network or other graphical model based classifier) may be used. As yet another example, a neural network classifier (e.g., a single layer neural network, a multiplayer neural network, a deep neural network, a recurrent neural network, a convolutional neural network, etc.) may be used. The classifier may be trained with training data that includes image features and corresponding counts determined manually by one or more lab technicians.

In act 314, the controller may count a number of objects classified as cells in the focused image. For example, the controller may count the number of objects classified as single live cells and count a number of cells within each object classified as a cluster of live cells to yield a total number of live cells in the focused image. The number of dead cell(s) may also be counted to identify the total number of cells (live and dead) in the focused image. The controller may count the number of live cells in a cluster of live cells in any of a variety of ways. For example, the controller may the number of cells within a cluster of live cells may be identified by, for example, analyzing an intensity contour associated with the cell cluster. The center of the cells in the live cell cluster may appear to be a bright spot in the focused image. The bright spot may appear as a sharp peak in the intensity contour at the center of each cell in the cluster. Thereby, the number of peaks in the intensity contour of the live cell cluster may be counted to identify the number of cells in the live cell cluster.

In some embodiments, only a portion of the cells in the vessel may be visible in the images captured by the imaging system (e.g., captured in act 304). In these embodiments, the system may divide up the vessel into a plurality of sections and count the number of cells visible in each section by performing acts 303 and/or 305. Once the cells in each section are counted, the total number of cells may be identified by summing the cells in each section.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

Figure 4:
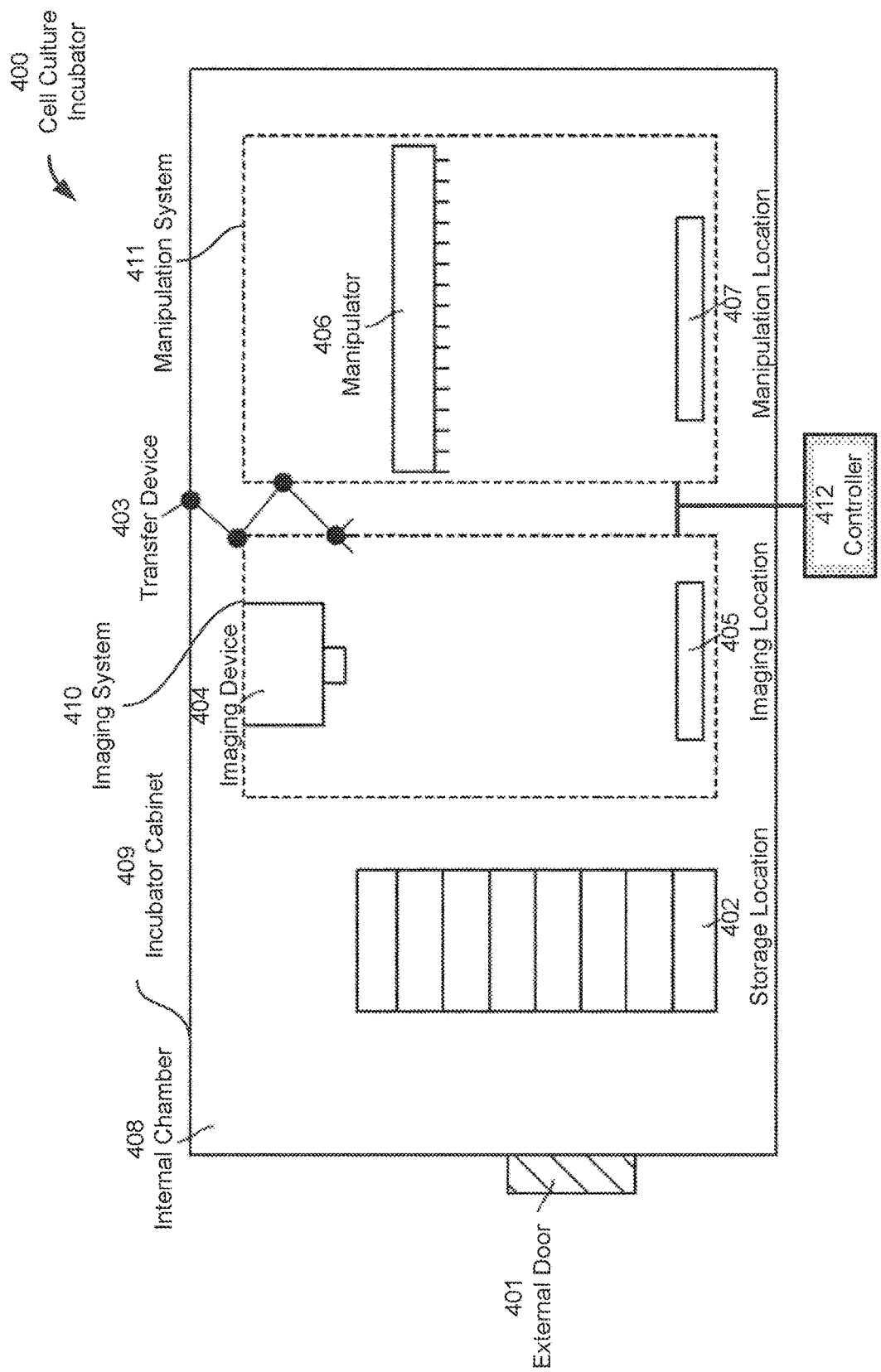
FIG. 4 is a diagram of an example cell culture incubator, according to some embodiments of the technology described herein.

In some embodiments, the techniques described herein may be employed in a cell culture incubator. The cell culture incubator may be constructed to culture cells with little or no manual handling. Thereby, the possibility of the cells becoming contaminated may be reduced or eliminated. An example of such a cell culture incubator is shown in FIG. 4 by cell culture incubator 400. The cell culture incubator 400 includes an incubator cabinet 409 having an internal chamber 408 for incubation of cells in one or more cell culture vessels. The incubator cabinet 409 includes an external door 401 that opens and closes to permit communication between an external environment and the incubator cabinet 409. In some embodiments, the external door 401 opens and closes to permit communication between an external environment and the internal chamber 408. The internal chamber 408 is configured to hold one or more cell culture vessels. The one or more cell culture vessels are stored in a storage location 402. In some embodiments, the storage location 402 is a free-standing structure. For example, a storage location 402 may be a test tube or culture flask rack that can be removed from the internal chamber 408 for loading and unloading of culture vessels. In some embodiments, the storage location 402 is affixed to a surface of the internal chamber 408. For example, the storage location 402 may be a series of racks or shelves that are connected to the walls or floor of the internal chamber 408 and are thus not able to be removed from the incubator cabinet 409.

In some embodiments, the cell culture incubator 400 includes a transfer device 403 for moving one or more cell culture vessels. The transfer device 403 may be affixed to any appropriate surface of the internal chamber 408. For example, the transfer device 403 may be affixed to the top or ceiling of the internal chamber 408. Alternatively, the transfer device 403 may be affixed to a side wall of the internal chamber 408. In some embodiments, the transfer device 403 is not affixed to the wall of the internal chamber 408. For example, the transfer device 403 may rest on a wheeled tripod or other mobile structure that can be moved around the internal chamber 408.

In some embodiments, the transfer device 403 moves one or more cell culture vessels from the storage location 402 to an imaging location 405 in an imaging system 410 or to a manipulation location 407 in a manipulation system 411. The transfer device 403 can also move one or more cell culture vessels from an imaging location 405 to a manipulation location 407 or from a manipulation location 407 to an imaging location 105. When imaging or manipulation are complete, the transfer device 403 moves one or more cell culture vessels from an imaging location 405 or a manipulation location 407 to a storage location 402.

In some embodiments, the transfer device 403 may include one or more elements such as valves (e.g., electromagnetic or pneumatic valves), gears, motors (e.g., electrical or stepper motors), stages (e.g., xy or xyz stages), pistons, brakes, cables, ball-screw assemblies, rack-and-pinion arrangements, grippers, arms, pivot points, joints, translational elements, or other mechanical or electrical elements. In some embodiments, the transfer device 403 may include one or more robotic elements. For example, the transfer device 403 may include a robotic arm capable of gripping, lifting, pushing, grabbing, sliding, rotating, translating, releasing, raising, lowering, and/or tilting one or more cell culture vessels. In some cases, the transfer device 403 selectively and releasably grips one or more cell culture vessels. In certain embodiments, a transfer device 403 may include an arm coupled to a mechanical gripper. For example, an arm may include a mechanical gripper at or near one end for releasably gripping a cell culture vessel and be securely coupled to a surface or element of the incubator at or near the other end. In some embodiments, a robotic arm includes a pivot point where the mechanical gripper couples to the arm and one or more pivot and/or translational joints along the arm to permit flexible rotation and translation of a portion of the arm. In this manner, a robotic arm may access one or more cell culture vessels at different horizontal and vertical positions within an incubator cabinet (e.g., within a storage array in an internal chamber).

In some embodiments, the incubator cabinet 409 includes the imaging location 405 and the manipulation location 407. In some embodiments, the imaging location 405 is located on a surface of the internal chamber 408 opposite from an imaging device 404. In some embodiments, the imaging location 405 is a platform, either free-standing or affixed to a surface of the internal chamber 408. In some embodiments, the platform is movable. For example, a movable platform may be affixed to two or more rods that allow the platform to be moved left, right, forward, backward, up or down in relation to the imaging device 404. In some embodiments, the movable platform is motorized.

In some embodiments, the imaging system 410 may be configured to capture images of cells in cell culture vessels when the vessels are at the imaging location 408. For example, the imaging system may be configured to capture phase-contrast images and/or bright-field images of the cells in the cell culture vessels. The imaging system 410 may comprise an imaging device 404 configured to measure light (e.g., transmitted or scattered light), color, morphology, and/or other detectable parameters. The imaging device 404 may be, for example, a monochrome imaging device, a red-green-blue (RGB) imaging device, a spectral imaging device, a fluorescence imaging device, and/or a multi-channel imaging device. In certain embodiments, the imaging system 410 includes one or more lenses, fibers, apertures, mirrors, light sources (e.g., a laser or lamp), or other optical elements. The imaging system 410 may be implemented as, for example, a microscope.

In some embodiments, the manipulator system 411 includes a manipulator 406 that manipulates the cells of cell culture vessels when the vessels are at the manipulation location 407. In some embodiments, the manipulator 406 has an array of needles, capillaries, pipettes, and/or micromanipulators. For example, the manipulator 406 may include a cell picker. In some embodiments, a manipulator 406 comprises one or more cell pickers. In some embodiments, the manipulator 406 may include a cell scraper comprising a scraping edge suitable for scraping cells off of a surface. In some embodiments, the scraping edge is a portion of a cell scraper contactable with the surface of a cell culture vessel or other surface and suitably configured for scraping matter from the surface for cleaning the surface and/or for scraping cells adhering to the surface without substantially killing the cells, e.g., by mechanically lysing the cells. In some embodiments, it is desirable for a scraping edge or scraping edge assembly to be disposable in order to prevent cross-contamination between cell cultures. Thus, in some embodiments, the scraping edge or scraping edge assembly is disposable.

In some embodiments, the cell culture incubator 400 includes a controller 412 that is configured to control operation of one or more components in the cell culture incubator 400 such as the imagining system 410, the manipulator system 411, and/or the transfer device 403. The controller 412 may be configured to perform one or more acts in the methods described above. For example, the controller 412 may provide instructions to the transfer device 403 to cause the transfer device to move a cell culture vessel to the imaging location 405 and provide instructions to the imaging system 410 to capture an image of the cells in the cell culture vessel.

Aspects of the disclosure relate to incubators and methods for culturing, manipulating, and/or monitoring cells under controlled conditions (e.g., under aseptic and/or sterile conditions). In some embodiments, cell cultures are grown within a culture vessel in an incubator of the disclosure. As used herein, a "cell culture vessel" is a device including a housing and one or more chambers for culturing cells. In some embodiments, the housing is a frame. The frame may be coupled to a lid. The one or more chambers may include cell culturing media including one or more membranes. In some embodiments, a cell culture vessel may include nutrients for promoting the growth of cells. In certain embodiments, a cell culture vessel may entirely enclose one or more cells or groups thereof. The housing of a cell culture vessel may include one or more pores or openings to permit the transfer of gases between a cell culture vessel and its surrounding environment. In certain embodiments, a cell culture vessel includes a transparent or optically clear window. For example, a lid coupled to the housing of a cell culture vessel may include an optically clear portion for viewing cells e.g., with an imaging system. In some embodiments, a cell culture vessel includes one or more portions that are substantially non-reflective.

Cell culture vessels may be configured for culturing cells of different types, including eukaryotic or prokaryotic cells. In some embodiments, cells are mammalian cells (e.g., human cells, canine cells, bovine cells, ovine cells, feline cells, or rodent cells such as rabbit, mouse, or rat cells). In some embodiments, cells are insect cells, avian cells, microbial cells (e.g., yeast cells such as *Saccharomyces cerevisiae, Kluyveromyces lactis,* or *Pischia pastoris* cells, or bacterial cells such as *Escherichia coli, Bacillus subtilis,* or *Corynebacterium* cells), insect cells (e.g., *Drosophila* cells, or Sf9 or Sf21 cells), plant cells (e.g., algal cells) or cells of any other type.

In some embodiments, cell culture vessels may be pre-kitted with one or more reagents desired for a particular purpose, e.g., for growing cells, for differentiating cells, for subjecting cells to a particular assay condition, etc. In some embodiments, pre-kitted cell culture vessels contain reagents useful for performing a particular experiment (e.g., cell growth media, growth factors, selection agents, labeling agents, etc.) on a cell culture, in advance of the experiment. Pre-kitted cell culture vessels may facilitate experimental protocols by providing cell culture-ready vessels that do not require the addition of reagents. For example, progenitor cells from a patient may be added to a cell culture vessel pre-kitted with reagents for cell differentiation for the purpose of expanding a population of differentiated cells for autologous cell therapy. Pre-kitted cell culture vessels can be stored at any appropriate temperature, which is determined by the recommended storage parameters of the reagents within the pre-kitted cell culture vessel. In some embodiments, pre-kitted cell culture storage vessels are stored prior to use at temperatures between about −80° C. and about 37° C. In some embodiments, pre-kitted cell culture storage vessels are stored prior to use at temperatures between about −80° C. and about −20° C. In some embodiments, pre-kitted cell culture storage vessels are stored prior to use at temperatures between about −20° C. and about 4° C. In some embodiments, pre-kitted cell culture storage vessels are stored prior to use at temperatures between about 4° C. and about 37° C. In some embodiments, pre-kitted cell culture vessels are disposable. In some embodiments, pre-kitted cell culture vessels are reusable and/or refillable.

In some embodiments, cells are cultured for producing natural products (e.g., taxols, pigments, fatty acids, biofuels, etc.). In some embodiments, cells are cultured to express recombinant products (e.g., recombinant protein products such as antibodies, hormones, growth factors, or other therapeutic peptides or proteins). In some embodiments, cells are expanded and/or differentiated for therapeutic use such as implantation into a subject (e.g., a human subject) in order to provide or supplement a cellular, tissue, or organ function that is missing or defective in the subject.

In some embodiments, cells are from immortalized cell lines. Non-limiting examples of cell lines include human cells, for example HeLa cells, prostate cancer cells (e.g., DU145, PC3 and/or Lncap cells), breast cancer cells (e.g., MCF-7, MDA-MB-438, and/or T47D cells), acute myeloid leukemia cells (e.g., THP-1 cells), glioblastoma cells (e.g., U87 cells), neuroblastoma cells (e.g., SHSY5Y cells), bone cancer cells (e.g., Saos-2 cells) and chronic myelogenous leukemia cells (e.g., KBM-7 cells). In some embodiments, cell lines include primate cell lines, rodent cell lines (e.g., rat or mouse cell lines), canine cell lines, feline cell lines, Zebrafish cell lines, Xenopus cell lines, plant cell lines, or any other cell lines. In some embodiments, cells are human 293 cells (e.g., 293-T or HEK 293 cells), murine 3T3 cells, Chinese hamster ovary (CHO) cells, CML T1 cells, or Jurkat cells.

In some embodiments, cells are primary cells, feeder cells, or stem cells. In some embodiments, cells are isolated from a subject (e.g., a human subject). In some embodiments, cells are primary cells isolated from a tissue or a biopsy sample. In some embodiments, cells are hematopoietic cells. In some embodiments, cells are stem cells, e.g., embryonic stem cells, mesenchymal stem cells, cancer stem cells, etc. In some embodiments, cells are isolated from a tissue or organ (e.g., a human tissue or organ), including but not limited to solid tissues and organs. In some embodiments, cells can be isolated from placenta, umbilical cord, bone marrow, liver, blood, including cord blood, or any other suitable tissue. In some embodiments, patient-specific cells are isolated from a patient for culture (e.g., for cell expansion and optionally differentiation) and subsequent re-implantation into the same patient or into a different patient. Accordingly, in some embodiments, cells grown in the incubators disclosed herein may be used for allogenic or autogeneic therapy. In some embodiments, cells grown in the incubators disclosed herein may be genetically modified, expanded and reintroduced into a patient for the purpose of providing an immunotherapy (e.g., chimeric antigen receptor therapy (CAR-T), or delivery of CRISPR/Cas modified cells).

In some embodiments, a primary cell culture includes epithelial cells (e.g., corneal epithelial cells, mammary epithelial cells, etc.), fibroblasts, myoblasts (e.g., human skeletal myoblasts), keratinocytes, endothelial cells (e.g., microvascular endothelial cells), neural cells, smooth muscle cells, hematopoietic cells, placental cells, or a combination of two or more thereof.

In some embodiments, cells are recombinant cells (e.g., hybridoma cells or cells that express one or more recombinant products). In some embodiments, cells are infected with one or more viruses.

In some embodiments, cells are isolated from tissues or biological samples for ex vivo culture in the incubators provided herein. In some embodiments, cells (e.g., white blood cells) are isolated from blood. In some embodiments, cells are released from tissues or biological samples using physical and/or enzymatic disruption. In some embodiments, one or more enzymes such as collagenase, trypsin, or pronase are used to digest the extracellular matrix. In some embodiments, tissue or biological samples are placed in culture medium (e.g., with or without physical or enzymatic disruption) and cells that are released and that grow in the culture medium can be isolated for further culture.

As used herein, cell culture refers to a procedure for maintaining and/or growing cells under controlled conditions (e.g., ex vivo). In some embodiments, cells are cultured under conditions to promote cell growth and replication, conditions to promote expression of a recombinant product, conditions to promote differentiation (e.g., into one or more tissue specific cell types), or a combination of two or more thereof.

In some embodiments, cell culture vessels are configured for culturing cells in suspension. In some embodiments, cell culture vessels are configured for culturing adherent cells. In some embodiments, cell culture vessels are configured for 2D or 3D cell culture. In some embodiments, cell culture vessels include one or more surfaces or micro-carriers to support cell growth. In some embodiments, these are coated with extracellular matrix components (e.g., collagen, fibrin and/or laminin components) to increase adhesion properties and provide other signals needed for growth and differentiation. In some embodiments, cell culture vessels include one or more synthetic hydrogels such as polyacrylamide or polyethylene glycol (PEG) gels to support cell growth. In some embodiments, cell culture vessels include a solid support with embedded nutrients (e.g., a gel or agar, for example, for certain bacterial or yeast cultures). In some embodiments, cell culture vessels include a liquid culture medium.

In some embodiments, cells are cultured in one of any suitable culture media. Different culture media having different ranges of pH, glucose concentration, growth factors, and other supplements can be used for different cell types or for different applications. In some embodiments, custom cell culture media or commercially available cell culture media such as Dulbecco's Modified Eagle Medium, Minimum Essential Medium, RPMI medium, HA or HAT medium, or other media available from Life Technologies or other commercial sources can be used. In some embodiments, cell culture media include serum (e.g., fetal bovine serum, bovine calf serum, equine serum, porcine serum, or other serum). In some embodiments, cell culture media are serum-free. In some embodiments, cell culture media include human platelet lysate (hPL). In some embodiments, cell culture media include one or more antibiotics (e.g., actinomycin D, ampicillin, carbenicillin, cefotaxime, fosmidomycin, gentamycin, kanamycin, neomycin, penicillin, penicillin streptomycin, polymyxin B, streptomycin, tetracycline, or any other suitable antibiotic or any combination of two or more thereof. In some embodiments, cell culture media include one or more salts (e.g., balanced salts, calcium chloride, sodium chloride, potassium chloride, magnesium chloride, etc.). In some embodiments, cell culture media include sodium bicarbonate. In some embodiments, cell culture media include one or more buffers (e.g., HEPES or other suitable buffer). In some embodiments, one or more supplements are included. Non-limiting examples of supplements include reducing agents (e.g., 2-mercaptoethanol), amino acids, cholesterol supplements, vitamins, transferrin, surfactants (e.g., non-ionic surfactants), CHO supplements, primary cell supplements, yeast solutions, or any combination of two or more thereof. In some embodiments, one or more growth or differentiation factors are added to cell culture media. Growth or differentiation factors (e.g., WNT-family proteins, BMP-family proteins, IGF-family proteins, etc.) can be added individually or in combination, e.g., as a differentiation cocktail comprising different factors that bring about differentiation toward a particular lineage. Growth or differentiation factors and other aspects of a liquid media can be added using automated liquid handlers integrated as part of an incubator provided herein.

In some aspects, the incubators and methods described herein provide and maintain appropriate temperature and gas mixtures for cell growth. It should be appreciated that cell growth conditions differ for different cell types and that the incubators described herein can be programmed to maintain different conditions. In some embodiments, conditions of approximately 37° C., and 5% $CO_2$ are used for mammalian cells.

In some embodiments, devices and methods described herein are used to monitor or assay the culture media for nutrient depletion, changes in pH, changes in temperature accumulation of apoptotic or necrotic cells, and/or cell density. In some embodiments, devices and methods described herein are used to modify or change the culture media or conditions and/or to passage the cell cultures when appropriate. In some embodiments, these procedures are automated.

In some embodiments (e.g., for adherent cell cultures), culture media can be removed directly by aspiration and replaced with fresh media. In some embodiments (e.g., for non-adherent/suspension cultures), media changes can involve centrifuging a cell culture, removing the old culture media and replacing it with fresh media. In some embodiments, the centrifuge is located in the internal chamber of an incubator. In some embodiments, culture vessels allow for continuous media replacement. In some embodiments, the incubators described herein may include one or more components that can be used to process, replace, supply, and/or maintain different aspects of a culture media to support cells. Incubators may include a reservoir containing waste media and/or a reservoir containing fresh media. Such reservoirs may be present (e.g., for temporary storage) within a refrigerator inside the incubator or a refrigerated section of the incubator. In some embodiments, one or more reservoirs are provided outside the incubators and piping is provided into and out from the incubator space to supply or draw from a liquid handler units (e.g., liquid handle units having an aspirator) or temporary reservoir within the incubator to facilitate cells feeding, media changes, and other related needs. For suspension cells, devices may be provided within the incubator to separate cells from waste media (e.g., centrifuge(s) to facilitate cell pelleting) to facilitate automated media changes as part of an incubator provided herein. In some embodiments, the document provides a system comprising a cell culture incubator coupled to a computer, capable of automatically monitoring and adjusting cell culture conditions for optimal growth of the cell culture.

In some embodiments, cells are passaged within an incubator cabinet described herein. In some embodiments, a cell culture is split and a subset of the cell culture is transferred to a fresh culture vessel for further growth. In some embodiments (e.g., for adherent cell cultures), cells are detached (e.g., mechanically, for example using gentle scraping, and/or enzymatically, for example using trypsin-EDTA or one or more other enzymes) from a surface prior to being transferred to a fresh culture vessel. In some embodiments (e.g., for suspension cell cultures), a small volume of a cell culture is transferred to a fresh culture vessel.

In some embodiments, cell cultures are manipulated in other ways during culture within an incubator cabinet of an incubator herein. For example, cell cultures may be transfected with nucleic acids (e.g., DNA or RNA) or exposed to viral infection (e.g., using recombinant virus particles to deliver DNA or RNA), while for example, remaining within an incubator cabinet of an incubator provided herein.

It should be appreciated that aseptic techniques can be used to prevent or minimize contamination of cell cultures during growth and manipulation. In some embodiments equipment (e.g., pipettes, fluid handling devices, manipulating devices, other automated or robotic devices, etc.) that is used for cell culture is sterilized using an appropriate technique.

Non-limiting techniques include heat exposure (e.g., autoclaving) surface disinfection (e.g., using alcohol, bleach, or other disinfectant), irradiation, and/or exposure to a disinfectant gas (e.g., ozone, hydrogen peroxide, etc.) as described herein. In some embodiments, media is sterilized using an appropriate technique. Non-limiting techniques include heat exposure (e.g., autoclaving), antimicrobial/antiviral treatment, filtration, and/or irradiation.

In some embodiments, manipulations of cell cultures are performed under aseptic conditions, for example, in an environment (e.g., within an incubator chamber) that has been disinfected and in which the air has been filtered to remove potential contaminants.

In some embodiments, cell cultures are grown and maintained under GMP-compliant conditions, including those that include using GMP-compliant media or GMP-compliant liquid handling equipment. In some cases, cell cultures are grown and maintained by performing methods in conjunction with standard operation procedures (SOPs).

In some embodiments, cell cultures can be monitored and/or evaluated to detect contamination. In some embodiments, contamination by cells from a different type of organism can be detected. In some embodiments, contamination of a mammalian cell culture by mycoplasma, bacteria, yeast, or viruses can be detected using any suitable technique. In some embodiments, cell culture contamination can be detected by assaying for changes or for rates of change of one or more culture properties such as pH, turbidity, etc., that are characteristic of contamination (e.g., by bacteria or yeast) and not characteristic of the cells (e.g., mammalian cells) being grown in culture. In some embodiments, one or more molecular detection assays (e.g., PCR, ELISA, RNA labeling or other enzymatic techniques) or cell-based assays can be used to detect contamination (e.g., mycoplasma, bacterial, yeast, viral, or other contamination).

In some embodiments, cell cultures can be monitored and/or evaluated to detect contamination with cells of similar types (e.g., a human cell line contaminated by different human cells or by different mammalian cells). In some embodiments, cell cultures and their potential contamination can be evaluated using DNA sequencing or DNA fingerprinting (e.g., short tandem repeat-STR-fingerprinting), isoenzyme analysis, human lymphocyte antigen (HLA) typing, chromosomal analysis, karyotyping, cell morphology, or other techniques.

In some embodiments, cells produced using the incubators or methods described herein can be frozen to preserve them for later use and/or for transport. In some embodiments, cells are mixed with a cryopreservation composition after growth and/or differentiation and prior to freezing. A cryopreservation composition can be added to a cell culture vessel or cells can be transferred from a cell culture vessel to a cryopreservation vessel along with a cryopreservation composition. Non-limiting examples of cryoprotectants that can be included in a cryopreservation composition include DMSO, glycerol, PEG, sucrose, trehalose, and dextrose. In some embodiments, a freezer may be provided as a component of an incubator to facilitate freezing of cells isolated from cell cultures. For example, one or more freezers may be located in an internal chamber and/or integrated into the incubator cabinet (e.g., into the wall of the incubator cabinet).

In some embodiments this document relates to incubators and methods for culturing, manipulating, and/or monitoring cells under controlled conditions (e.g., under aseptic and/or sterile conditions). In some embodiments, the cell culture incubators included an incubator cabinet having an internal chamber for incubation of cells in one or more cell culture vessels. In some cases, in addition to an internal door from the transfer chamber to the internal chamber, the incubators include at least one external door (e.g., 1, 2, 3, 4, or more external doors) opening from an external environment directly to the internal chamber, for example, to provide alternative access to the internal chamber during periods of time when the incubator is not operational, e.g., during maintenance of the incubator. In some embodiments, incubators include a storage location within the internal chamber for storing one or more cell culture vessels.

As used herein, an "incubator cabinet" is a housing that includes one or more chambers configured to hold one or more cell culture vessels. In some embodiments, an incubator cabinet includes a transfer chamber and an internal chamber, one or both of which are configured to hold one or more cell culture vessels. In some embodiments, an incubator may include one or more other elements such as one or more gas sources (e.g., a gas cylinder or ozone generator), tubing (e.g., to convey one or more liquids or gases such as water, distilled water, deionized water, cell culture medium, air, carbon dioxide, ozone, and oxygen), airflow mechanisms (e.g., valves, release valves, pinholes, gas regulators, and mass flow regulators), pressure mechanisms (e.g., a pump such as a dry scroll pump, rotary pump, momentum transfer pump, diffusion pump, or diaphragm pump; a suction tube; a vacuum system; and an air blower), environmental monitors and controls (e.g., a gas sensor and/or monitor to sense and/or control concentrations of gases such as carbon dioxide, oxygen, and ozone; heat sources or sinks; temperature monitors and controls; humidity monitors; gas scrubbers; air filters; instrumentation for measuring particulate matter; pressure gauges; and flow meters), doors (e.g., openings or panels) windows (e.g., optical windows made of glass, plastic, composite, or other substantially transparent material for viewing an area inside the incubator), ports (e.g., to permit the introduction or removal of one or more gases or liquids), light sources (e.g., lamps, bulbs, lasers, and diodes), optical elements (e.g., microscope objectives, mirrors, lenses, filters, apertures, wave plates, windows, polarizers, fibers, beam splitters, and beam combiners), imaging elements (e.g., cameras, barcode readers), electrical elements (e.g., circuits, cables, power cords, and power supplies such as batteries, generators, and direct or alternating current supplies), controllers, mechanical elements (e.g., motors, wheels, gears, robotic elements, and actuators such as pneumatic actuators, electromagnetic actuators, motors with cams, piezoelectric actuators, and motors with lead screws), and control elements (e.g., spin-wheels, buttons, keys, toggles, switches, cursors, screws, dials, screens, and touch-screens). In some embodiments, one or more of these other elements are part of the incubator, but are external to the incubator cabinet. In some embodiments, one or more of these other elements are included within the incubator cabinet.

In some embodiments, incubators or incubator cabinets provided herein are rectangularly cuboidal in shape. In some embodiments incubators or incubator cabinets provided herein have a rectangular footprint in a range of 1 ft$^2$ to 16 ft$^2$. In some embodiments incubators or incubator cabinets provided herein have a rectangular footprint of up to about 1 ft$^2$, 2 ft$^2$, 3 ft$^2$, 4 ft$^2$, 5 ft$^2$, 6 ft$^2$, 7 ft$^2$, 8 ft$^2$, 9 ft$^2$, 10 ft$^2$, 11 ft$^2$, 12 ft$^2$, 13 ft$^2$, 14 ft$^2$ or 16 ft$^2$. In some embodiments , 15 ft, incubators or incubator cabinets provided herein have a total chamber volume in a range of 1 ft$^3$ to 100 ft$^3$. In some embodiments incubators or incubator cabinets provided herein have a chamber volume of up to about 1 ft$^3$, 5 ft$^3$, 10 ft$^3$, 25 ft$^3$, 50 ft$^3$ or 100 ft$^3$. In some embodiments incubators or incubator cabinets provided herein have a rectangular footprint in a range of 0.09 m$^2$ to 1.78 m$^2$. In some embodiments incubators or incubator cabinets provided herein have a rectangular footprint of up to about 0.1 m$^2$, 0.2 m$^2$, 0.3 m$^2$, 0.4 m$^2$, 0.5 m$^2$, 0.6 m$^2$, 0.7 m$^2$, 0.8 m$^2$, 0.9 m$^2$, 1.0 m$^2$, 1.1 m$^2$, 1.2 m$^2$, 1.3 m$^2$, 1.4 m$^2$, 1.5 m$^2$, 1.6 m$^2$, or 1.7 m$^2$. In some embodiments, incubators or incubator cabinets provided herein have a total chamber volume in a range of 0.03 m$^3$ to 3 m$^3$. In some embodiments incubators or incubator cabinets provided herein have a chamber volume of up to about 0.03 m$^3$, 0.1 m$^3$, 0.3 m$^3$, 1 m$^3$, or 3 m$^3$ .

As used herein, a "storage location" refers to a location at which one or more cell culture vessels is stored (e.g. within an incubator cabinet). For example, one or more cell culture vessels may be stored at a storage location and later transferred to a different location (e.g., an imaging location). The storage location may be disposed in the internal chamber of the incubator cabinet. A storage location may be configured for storing a plurality of cell culture vessels. For example, a storage location may include one or more storage arrays, racks, shelves, pigeon-holes, cubbies, trays, slots, or other positions or mechanisms. In some embodiments, a storage location may be configured to store cell culture vessels horizontally, while in other embodiments it may be configured to store cell culture vessels vertically. For example, a storage location may include a plurality of slots to receive cell culture vessels stacked vertically over one another. A storage location may be configured to hold 1, 2, 3, 4, 5, 6, 7, 8, 9, 10, 15, 20, 25, 30, 35, 40, 45, 50, 100, or any other number of cell culture vessels. In some embodiments, a storage location may be configured to hold greater than 100 cell culture vessels. In some embodiments, a storage location may include a mechanism for moving one or more storage arrays, racks, shelves, pigeon-holes, cubbies, trays, slots, or other positions or mechanisms. For example, a storage location may include one or more motors and movable stages (e.g., an xy or xyz stage) to move a storage rack from one position in an internal chamber to another position in an internal chamber, e.g., to facilitate access to one or more cell culture vessels stored in different locations. In some embodiments, the incubator cabinet may include one or more cell culture vessel transfer devices for moving one or more cell culture vessels.

A storage location may be configured to securely hold or receive one or more cell culture vessels. For example, one or more components of the storage location may include one or more locking mechanisms that have one or more adhesive, magnetic, electrical, and/or mechanical components (e.g., snaps, fasteners, locks, clasps, gaskets, o-rings, septa, springs, and other engagement members). In some embodiments, a storage location and/or cell culture vessel may include one or more grooves or depressions and/or may involve pieces of molded plastic. For example, a cell culture vessel may include one or more protruded features (e.g., a rim or knob) that is molded for insertion into one or more corresponding grooves, holes, or depressions at a storage location. In some cases, a cell culture vessel may include one or more grooves, holes, or depressions that are molded to fit one or more corresponding protruded features at a storage location.

As used herein, a "fiducial mark" refers to a feature that facilitates alignment of one or more components. In some embodiments, fiducial marks may include one or more hole apertures over a fluorescent media or printed or embossed fluorescent material. In other embodiments, fiducial marks may include grids, lines, or symbols. In some embodiments, one or more cell culture vessels include one or more fiducial marks to facilitate alignment of one or more cell culture vessels with an imager.

In some embodiments, an incubator cabinet is single-walled. In some embodiments, an incubator is double-walled. In some embodiments, insulation material is provided between the double walls of an incubator cabinet to control heat loss from the incubator cabinet and facilitate temperature control in the incubator cabinet. In some embodiments, the outer wall of an incubator cabinet comprises a sheet metal, e.g., a 14-20 gauge cold rolled steel. In some embodiments, an inner wall (e.g., a chamber surface) of an incubator cabinet includes electro-polished stainless steel. In some embodiments, an inner wall (e.g., a chamber surface) of an incubator cabinet includes corrosion resistant materials, such as, titanium, cobalt-chrome, tantalum, platinum, zirconium, niobium, stainless steel, and alloys thereof. However, in some embodiments, a chamber surface of an incubator cabinet includes a polymeric material such as polytetrafluoroethylene (PTFE), or a polymeric material know under the trade name of Parylene. In some embodiments, a chamber surface may have anti-microbial properties, such as copper or silver or anti-microbial compounds incorporated into a polymeric surface coating.

In some embodiments, the environment inside an incubator is controlled by a control system that may be configured to control the temperature, humidity, carbon dioxide, oxygen and other gaseous components (e.g., sterilization gases, such as, ozone, and hydrogen peroxide) inside the incubator (e.g., in one or more internal chambers). In some embodiments, a control system controls the environmental conditions (e.g., temperature, humidity, carbon dioxide, oxygen and other gaseous components) within each internal chamber separately. For example, in order to protect sensitive mechanical, electronic and optical components, the humidity of an internal chamber may be maintained at a lower level than an internal chamber having a storage location. In some embodiments, the incubator is further provided with a monitoring system with predefined sensors. Examples of monitoring devices include but are not limited to oxygen monitors, carbon dioxide monitors, ozone gas detectors, hydrogen peroxide monitors and multi gas monitors. For example, in some embodiments, an incubator advantageously includes a plurality of sensors responsive to different parameters relevant to cell growth, which may include temperature, air purity, contaminant levels, pH, humidity, N2, $CO_2$, $O_2$ and light. By means of this monitoring system, parameters in the incubator can be measured using sensors for the duration of a culture or process. In some embodiments, parameters measured by the sensors are transmitted by the monitoring system via a line to a computer-controlled monitoring and control system for further processing as discussed elsewhere herein.

In some embodiments, an environmental monitoring system can be used in conjunction with an incubator described herein. In some embodiments, one or more sensors that provide for the measurement of temperature, air composition (e.g., $CO_2$ concentration, $O_2$ concentration, etc.), and/or humidity of the system can be associated with an incubator (e.g., fitted within an incubator cabinet). In some embodiments, one or more such sensors can be incorporated as part of an incubator (e.g., attached to, integral to, or otherwise connected to an internal wall or door of the incubator). In some cases, one or more sensors can be positioned at any suitable location(s) outside or inside an incubator cabinet (e.g., within a transfer chamber and/or an internal chamber, for example attached to an internal wall, and/or upper or lower internal surface).

In some embodiments, a gas sensor is provided that can provide a reading in real time of the concentration of gas in contact with the sensor (e.g., gas in a cabinet, or ambient air) in percent, parts per million, or any other standard unit. Gas sensors for use in the methods and incubators provided herein include $CO_2$ sensors, $O_2$ sensors, $N_2$ sensors, ozone gas detectors, hydrogen peroxide monitors, multi gas monitors, and CO sensors. Such sensors are available from a number of commercial sources. In some cases, the environment of the incubator may be modulated or controlled based upon the information provided by the sensors described herein. For example, the level of $CO_2$ in an incubator may be increased upon indication from a $CO_2$ sensor that a lower than desirable concentration of $CO_2$ is present in the incubator.

In some embodiments, one or more heating or cooling elements can be incorporated within the incubator (e.g., on an inner surface of the cabinet or door, and/or integrated within one or more of the walls and/or the base of the cabinet) for purposes of controlling the temperature within the incubator. In some embodiments, a heating element can be used for thawing liquids, for example, cell culture media or other reagents. In some embodiments, one or more air or oxygen sources, carbon filters, and/or one or more humidification or dehumidification systems are connected to the incubator and configured to control the level of oxygen, carbon dioxide, and/or humidity within the incubator (e.g., in response to signals from the one or more sensors in or attached to the incubator).

In some embodiments, an incubator can include one or more light sources (e.g., an incandescent bulb, LED, UV or other light source). These can be placed within the incubator to illuminate regions within the cabinet. In some embodiments, the culture system operation is monitored using a camera or other light sensitive device that can be placed within or outside the incubator. In some embodiments, the light source is a sterilizing light source. For example, a UV lamp may be located within the transfer chamber and/or the interior chamber of the incubator provided herein.

In some embodiments, the incubator includes a transparent object (e.g., window) that allows visible light or other light wavelengths from within the incubator to be detected by a camera or other light sensitive device placed outside the incubator. In some embodiments, the inner surface of the transparent object can be wiped (e.g., from the inside of the cabinet) to prevent or remove condensation droplets that may accumulate (e.g., due to the humid air inside the incubator) on the inner surface and interfere with the monitoring of the system. In some embodiments, the surface can be wiped by a wiper that is automatically controlled by a controller.

As used herein, a "door" is an element that permits communication between two or more environments or regions when opened and prevents communication between the two or more environments or regions when closed. A door may be of any type, such as a sliding door, pocket door, swinging door, hinged door, revolving door, pivot door, or folding door. The door may be manually, mechanically, or electrically operated. For example, an operator may open or close a door by manually grasping, pulling, pushing, and/or otherwise physically interacting with the door or an element thereof (e.g., a handle) or by operating a mechanical control (e.g., a button, toggle, spin-wheel, key, switch, cursor, screw, dial, screen, or touch-screen). In certain embodiments, a door may be controlled by electrical or digital controls, such as by a controller. A door may be an automatically opening door. For example, a door may include a sensor, such as a pressure, infrared, motion, or remote sensor, that detects whether the door is open or closed and/or controls when the door opens or closes. A door may open by mechanical, pneumatic, electrical, or other means. In some embodiments, one or more doors may include one or more locking mechanisms. In particular environments, one or more doors may include one or more interlocks (e.g., a mechanical interlock such as a pin, bar, or lock or an electrical interlock such as a switch) to prevent one or more doors from opening at an undesirable time (e.g., when one or more chambers are open to the outside environment).

In some embodiments, an incubator (e.g., an internal chamber, and/or a transfer chamber of an incubator cabinet) comprises one or more windows and/or doors, that, when closed, are sealed to preserve sterility (e.g., after one or more chambers of the incubator have been sterilized). In some embodiments, each seal of the incubator is air tight up to a threshold level of pressure (e.g., up to 1 atm). In some embodiments, a gasket is provided to ensure a desired level of sealing capacity. In general, a "gasket" is understood as a mechanical seal that fills the space between two objects, generally to prevent leakage between the two objects while under compression. Gaskets are commonly produced by cutting from sheet materials, such as gasket paper, rubber, silicone, metal, cork, felt, neoprene, nitrile rubber, fiberglass, or a plastic polymer (such as polychlorotrifluoroethylene). It is often desirable that a gasket be made from a material that provides some degree of yielding such that it is able to deform and fill tightly the space it is designed for, including any slight irregularities. In some embodiments, gaskets can be used with an application of sealant directly to the gasket surface to function properly. In some embodiments, a gasket material can be a closed-cell neoprene foam which is non-reactant with carbon dioxide or ozone.

As used herein, a "transfer device for moving one or more items" refers to a device that can transfer one or more items from a first location to a second location. In some embodiments, the one or more items are one or more cell culture vessels. In other embodiments, the one or more items are useful for maintenance of one or more cell culture vessels and include, but are not limited to, pipettes, capillaries, liquids (e.g., cell culture medium), nutrients, and other materials. In certain embodiments, the transfer device may transfer one or more items to or from multiple locations in an incubator. For example, a transfer device may be used to move a pipette to a maintenance location in an internal chamber for maintenance of one or more cell culture vessels. In some embodiments, an incubator includes more than one transfer device for moving one or more items (e.g., two or more separate transfer devices for transferring items between and within chambers).

A transfer device may include one or more elements such as valves (e.g., electromagnetic or pneumatic valves), gears, motors (e.g., electrical or stepper motors), stages (e.g., xy or xyz stages), pistons, brakes, cables, ball-screw assemblies, rack-and-pinion arrangements, grippers, arms, pivot points, joints, translational elements, or other mechanical or electrical elements. In some embodiments, a transfer device may include one or more robotic elements. For example, a transfer device may include a robotic arm capable of gripping, lifting, pushing, grabbing, sliding, rotating, translating, releasing, raising, lowering, and/or tilting one or more items (e.g., pipettes). In preferred embodiments, the transfer device selectively and releasably grips one or more pipettes. In certain embodiments, a transfer device may include an arm coupled to a mechanical gripper. For example, an arm may include a mechanical gripper at or near one end for releasably gripping a pipette and be securely coupled to a surface or element of the incubator at or near the other end. In some embodiments, a robotic arm includes a pivot point where the mechanical gripper couples to the arm and one or more pivot and/or translational joints along the arm to permit flexible rotation and translation of a portion of the arm. In this manner, a robotic arm may access one or more items (e.g., pipettes) at different horizontal and vertical positions within an incubator (e.g., within a storage array in an internal chamber).

As used herein, a "cell culture vessel transfer device" refers to a device that can transfer one or more cell culture vessels from a first location to a second location. In certain embodiments, the transfer device may transfer one or more items to or from multiple locations in an incubator. For example, a cell culture vessel transfer device may be used to move a cell culture vessel from a transfer chamber to an internal chamber, and/or from a storage location to an imaging location. In some embodiments, an incubator includes more than one transfer device for moving one or more items (e.g., separate means for transferring items between and within chambers). A cell culture vessel transfer device may include one or more elements such as valves (e.g., electromagnetic or pneumatic valves), gears, motors (e.g., electrical or stepper motors), stages (e.g., xy or xyz stages), pistons, brakes, cables, ball-screw assemblies, rack-and-pinion arrangements, grippers, arms, pivot points, joints, translational elements, or other mechanical or electrical elements. In some embodiments, a cell culture vessel transfer device may include one or more robotic elements. For example, a cell culture vessel transfer device may include a robotic arm capable of gripping, lifting, pushing, grabbing, sliding, rotating, translating, releasing, raising, lowering, and/or tilting one or more cell culture vessels. In preferred embodiments, the cell culture vessel transfer device selectively and releasably grips one or more cell culture vessels. In certain embodiments, a cell culture vessel transfer device may include an arm coupled to a mechanical gripper. For example, an arm may include a mechanical gripper at or near one end for releasably gripping a cell culture vessel and be securely coupled to a surface or element of the incubator at or near the other end. In some embodiments, a robotic arm includes a pivot point where the mechanical gripper couples to the arm and one or more pivot and/or translational joints along the arm to permit flexible rotation and translation of a portion of the arm. In this manner, a robotic arm may access one or more cell culture vessels at different horizontal and vertical positions within an incubator (e.g., within a storage array in an internal chamber).

In some embodiments, a transfer device includes a robotic arm. In some embodiments, the robotic arm includes a platform within an incubator cabinet that may move along a rail or conveyor running in various directions along an inner surface (e.g., inner wall, base, etc.) of incubator cabinet. In some embodiments, an incubator cabinet may be configured with more than one (e.g., 2, 3, 4, or 5, or more) robotic arms to increase the throughput of the instrument and to provide redundancy in the event that one of the robotic arms fail.

In some embodiments, a transfer device further can include a gripper assembly coupled to a robotic arm. In some embodiments, the gripper assembly includes one or more grippers mounted on the end or near the end of the robotic arm, each gripper including two or more (e.g., 3, 4, 5, or more) gripper fingers. In some embodiments, each of the gripper fingers of the robotic arm has a groove, friction plate, rubber pad, or other gripping surface. The gripping surface can allow the fingers to grip and transport various types of containers (e.g., culture vessels) within the cabinets. In some embodiments, the robotic arm may have an absolute encoder either coupled to the gripper assembly, the platform, or a separate absolute encoder for each of the gripper assembly the platform to determine whether the robotic arm is in a position where it may be safely homed (e.g., returned to a resting or storage configuration and/or location or origin of an operational coordinate system) without hitting an obstruction.

In some embodiments, because it may be desirable in certain situations for the reach of the robotic arm not to extend to some areas of the incubator cabinet, the robotic arm may instead reach these locations by inserting a container into or removing a container from a shuttle or conveyor belt located, for example on the incubator cabinet floor or other surface that moves along an axis (e.g., x-axis, y-axis) and provides access to at least some of those locations to which the robotic arm cannot reach.

In some embodiments, an incubator cabinet is designed to be used in conjunction with an external assay or laboratory automation system. For example, in some embodiments, the incubator cabinet may have a door having an opening large enough to allow the gripper arm to pivot outside of the incubator cabinet with a sufficient reach for the fingers to transport culture vessels or other containers or components between a transport line of the laboratory automation system and the incubator cabinet or the external assay components and the incubator cabinet.

In some embodiments, a robotic arm is designed to carry, among other things, culture vessels, in which case movements of the robotic arm are controlled to prevent jerking or accelerations of such vessels or other movements which may cause the spilling of samples from the vessels. In some embodiments, a robotic arm is designed to carry, among other things, culture vessels, in which case movements of the robotic arm are controlled to prevent movement of such vessels in ways which cause newly plated cells to congregate/concentrate in specific areas of the culture vessel.

In some embodiments, because a robotic arm transports vessels or other containers between specific positions in the incubator cabinet, the robotic arm or other components of the incubator can be designed to track precisely where the vessels or other containers are located. In some case, in an incubator cabinet with which a robotic arm may be used, there are likely to be areas, such as where other components of the incubator cabinet or walls of the incubator cabinet are located, and thus where certain movements of the robotic arm may be limited. In these cases, a homing mechanism can be used for each of various motors of the arms (e.g., x-motor, theta-motor and z-motor) to properly position the robotic arm to a known location after it is powered up or if a robotic arm collides with another object before resuming operation.

In some embodiments, an uninterruptible power supply ("UPS") is attached to or within the incubator cabinet, or contained with it, to allow for an orderly shut-down of incubator operations, including saving of various automation and sample information and the completion of any transport or transfer process that is underway (e.g., the transport of a container or vessel that is being carried by the robotic arm to its destination). The operator may be alerted to unauthorized opening of the incubator by an audible signal, a visual signal, an electronic signal (e.g., an email or a text message), or in some other manner. In some embodiments, a sensor or other feature is provided to detect when one or more doors of an incubator are opened (e.g., when an incubator cabinet door, such as an external or internal door, is opened). Such features are useful because they allow operators to keep track of or be warned of any unscheduled or unauthorized openings of the incubator (e.g., the incubator cabinet) that could jeopardize sterility, spoil a production, compromise an assay or experiment, etc. In some embodiments, a radiofrequency beacon or other signal source is located within the incubator (e.g., within the incubator cabinet) that can be used to determine the location of one or more devices within the incubator cabinet (e.g., devices having sensors that can detect the signal and use it to determine their location). In some embodiments, the devices could have signal sources and the sensor(s) could be located within one or more of the chambers of an incubator cabinet (e.g., located on an internal surface of an internal chamber).

In some embodiments, light signals or lasers (e.g., a grid of laser signals) can be used to determine the location of one or more devices or components within the incubator cabinet. Such information can be communicated, e.g., wired or wirelessly, to an external computer or monitoring station. The information can be used to control operation of a transfer device, e.g., a robotic arm, within the incubator cabinet to ensure that the transfer device can grab, manipulate or maneuver devices or items appropriately within the incubator cabinet.

In some embodiments, before containers or vessels are brought into an incubator cabinet, a user can select an automation system protocol based on the particular containers, vessels, ingredients, or cells that are being inserted into the incubator cabinet. Relevant information related to the incubator and/or one or more incubator components, and the cells being grown can be entered into a data system. For example, one or more identifiers such as barcodes (e.g., 1D or 2D barcodes) can be placed on the container or vessel and other significant information, such as, the type of container, the contents of the container, what assays or manipulations are to be performed on the sample in the container can be specified. In some embodiments, information related to the incubator system and/or cells can be contained in one or more barcodes, on a separate data system, or a combination thereof. The user may also enter information that identifies the dimensionality (e.g., height, diameter) of the vessel or other container, or the system itself may determine measure the height of the vessel or other container. Using this information, the robotic arm may be requested to transport a particular container, such as when an analytical module is ready to perform an assay or other manipulation on cells grown in the vessels or has completed performing an assay or manipulation.

The incubators provided herein include several components, including sensors, environmental control systems, robotics, etc. which may operate together at the direction of a computer, processor, microcontroller or other controller. The components may include, for example, a transfer device (e.g., robotic arm), a liquid handling devices, a delivery system for delivering culture vessels, or other components to or from the incubator cabinet, an environmental control system for controlling the temperature and other environmental aspects of the incubator cabinet, a door operation system, an imaging or detection system, and a cell culture assay system.

In some cases, operations such as controlling operations of a cell culture incubator and/or components provided therein or interfacing therewith may be implemented using hardware, software or a combination thereof. When implemented in software, the software code can be executed on any suitable processor or collection of processors, whether provided in a single component or distributed among multiple components. Such processors may be implemented as integrated circuits, with one or more processors in an integrated circuit component. A processor may be implemented using circuitry in any suitable format.

In some embodiments, a component (e.g., a controller) controls various processes performed inside the incubator. For example, a controller may direct control equipment (e.g., a manipulator, an imager, a fluid handling system, etc.). In some embodiments, the controller controls imaging of cell cultures, picking of cells, weeding of cells (e.g., removal of cell clumps), monitoring of cell culture conditions, adjustment of cell culture conditions, tracking of cell culture vessel movement within the incubator, and/or scheduling of any of the foregoing processes.

In certain embodiments, incubators provided herein are configured to permit one or more assays to be performed within an incubator cabinet or within a chamber operably connected to an incubator cabinet, e.g., a separate assay chamber that is part of the incubator. In some embodiments, incubators provided herein are configured to permit performance of a cell counting assay, a replication labeling assay, a cell membrane integrity assay, a cellular ATP-based viability assay, a mitochondrial reductase activity assay, a caspase activity assay, an Annexin V staining assay, a DNA content assay, a DNA degradation assay, a nuclear fragmentation assay, or a combination thereof. Other exemplary assays include BrdU, EdU, or H3-thymidine incorporation assays; DNA content assays using a nucleic acid dye, such as Hoechst Dye, DAPI, actinomycin D, 7-aminoactinomycin D, or propidium iodide; cellular metabolism assays such as AlamarBlue, MTT, XTT, and CellTitre Glo; nuclear fragmentation assays; cytoplasmic histone associated DNA fragmentation assays; PARP cleavage assays; and, TUNEL staining assays.

In some embodiments, incubators provided herein are configured to permit digital identification and marking of cells. For example, a cell or cells may be cultured in an incubator described herein and imaged via fluorescent microscopy to digitally mark (e.g., via a computer having imaging software that is coupled to the incubator) a cell or cells (e.g., a cell population) of interest (e.g., cells positive for fluorescence). The location of the marked cells can be stored on the computer's memory and accessed at a later time point. The digital marking of cell populations may permit marked cells to be subsequently viewed or manipulated. The subsequent viewing, and/or manipulating may be performed at the same location (e.g., an imaging location) at which the cells were digitally marked, or at a location remote from the location at which the cells were digitally marked (e.g., a manipulation location that is not the imaging location). In some cases, the digital marking of a cell or cells may be facilitated by alignment of the cell culture vessel housing said cells to the imager via one or more fiducial marks. In some embodiments, an incubator as described herein comprises a plurality of workstations (e.g., 1, or 2, or 3, or 4, or 5, or more workstations), wherein each workstation is configured to permit digital identification and marking of cells.

In certain embodiments, incubators provided herein are configured to permit high-throughput screening (HTS) within an incubator cabinet. In some embodiments, HTS refers to testing of up to, and including, 100,000 compounds per day. In some embodiments, screening assays may be carried out in a multi-well format, for example, a 96-well, 384-well format, or 1,536-well format, and can be performed using automated protocols. In such high throughput assays, it is possible to screen several thousand different compounds or compositions in a single day. In particular, each well of a microtiter plate can be used to run a separate assay against a selected test compound, or, if concentration or incubation time effects are to be observed, a plurality of wells can contain test samples of a single compound. It is possible to assay many plates per day; assay screens for up to about 6,000, 20,000, 50,000, or more than 100,000 different compounds are possible using the assays. Typically, HTS implementations of the assays disclosed herein involve the use of automation. In some embodiments, an integrated robot system that includes one or more robotic arms transports assay microplates between multiple assay stations for compound, cell and/or reagent addition, mixing, incubation, and finally readout or detection. In some aspects, an HTS assay may include preparing, incubating, and analyzing many plates simultaneously, further speeding the data-collection process.

In some embodiments, assays can include test cells, control cells, and one or more test compounds, e.g., 10, 100, 1000, 10,000, or more test compounds. The cells and test agents can be arranged in one or more vessels in a manner suitable for assessing effect of the test compound(s) on the cells. These assays can be performed within one or more incubator cabinets of one or more incubators described herein. Typically, the vessels contain a suitable tissue culture medium, and the test compounds are present in the tissue culture medium and may be delivered to the culture medium within an incubator cabinet of an incubator provided herein in an automated fashion. A medium appropriate for culturing a particular cell type can be selected for use. In some embodiments, a medium is free or essentially free of serum or tissue extracts, while in other embodiments such a component is present. In some embodiments, cells are cultured on a plastic or glass surface.

Figure 5:
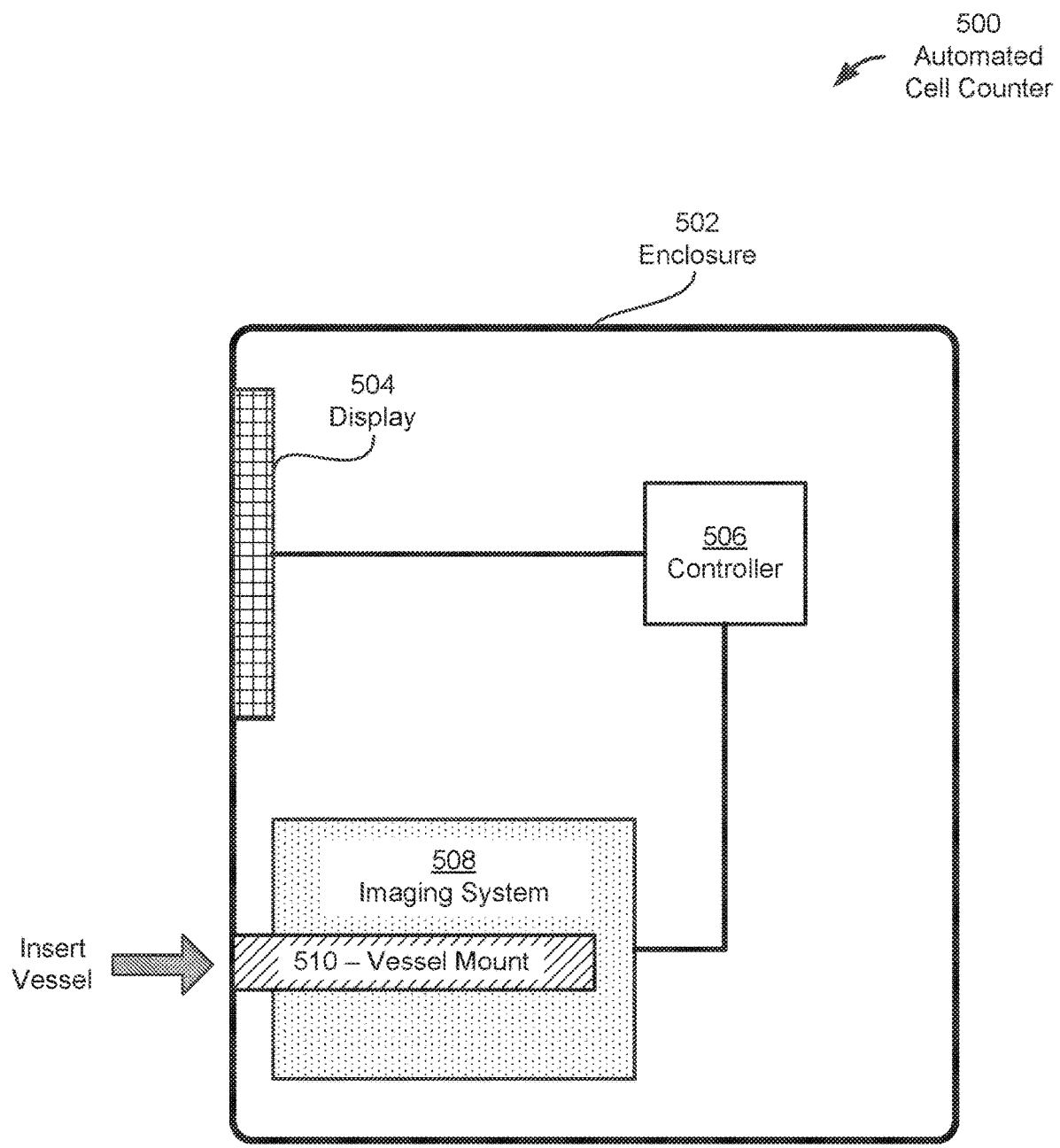
FIG. 5 is a diagram of an example automated cell counter, according to some embodiments of the technology described herein.

In some embodiments, the techniques described herein may be employed in an automated cell counter. The automated cell counter may be constructed as a device that is configured to receive a vessel containing cells and count the number of cells in the vessel. The automated cell counter may be implemented as a stand-alone device or may be integrated into another device (such as a cell culture incubator). An example of such an automated cell counter is shown in FIG. 5 by automated cell counter 500. As shown, the automated cell counter comprises a vessel mount 510 that is configured to receive cells in a vessel (e.g., suspended in a fluid in the vessel). The vessel mount 510 may hold the vessel in place for imaging by an imaging system 508 (e.g., hold the vessel at an imaging location). The imaging system 508 may be similar to (or the same as) the imaging system 410 described above with reference to FIG. 4. For example, the imaging system 508 may be configured to capture images of the cells in a vessel in a plurality of focal planes. A controller 506 may be coupled to the imaging system 508 and configured to direct the imaging system 508 to capture the images of the vessel in the vessel mount 510. The controller 506 may be configured to analyze images of the vessel captures by the imaging system 508 by performing one or more acts of the processes described above to count the number of cells in the vessel. The controller 506 may display a resulting count for the number of cells in the vessel via a display 504 coupled to the controller 506. The display 504 may be implemented as, for example, a liquid crystal display (LCD), a plasma display, and/or an organic light emitting diode (OLED) display. It should be appreciated that the display 504 may be implemented as a touch screen display to allow the controller 506 to receive input commands from an operator. For example, the controller 506 may receive a command from an operator of the automated cell counter 500 via the display 504 to start a cell counting process.

In some embodiments, one or more components of the automated cell counter 500 may be integrated into an enclosure 502. For example, the imaging system 508 and 506 may be at least partially enclosed within the enclosure 502. Additionally (or alternatively), the display 504 and/or the vessel mount 510 may be integrated into a sidewall of the enclosure 502 to allow an operator to access the display 504 and/or the vessel mount 510.

In some embodiments, the imaging systems described above (e.g., imaging systems 410 and imaging systems 508) may comprise a light filter to enhance the contrast between live cells and dead cells in a captured image of a vessel. Thereby, the dead cells may be more readily differentiated from the live cells. An example implementation of an imaging system that comprises a light filter is shown in FIG. 6A by imaging system 600A. The imaging system 600A may be configured to capture bright-field images of cells in a vessel 606. As shown, the imaging system 600A comprises a light source 602, a light filter 604, and an imaging device 608. The imaging device 608 may be configured to detect light that passes through the vessel 606 to capture an image of the cells in the vessel 606. The light source 602 may be configured to emit light in a broad spectrum (such as white light) to illuminate the vessel 606. The light source 602 may be implemented using light emitting diodes (LEDs), incandescent lamps, and/or halogen lamps. The light filter 604 may be configured to filter at least some of the light from the light source 602. For example, the light filter 604 may reduce an intensity of at least some light in a specified range of wavelengths. The particular range of wavelengths of light that the light filter 604 is configured to filter may depend upon, for example, the type(s) of cells being imaged, the construction of the imaging device 608, the spectrum of the light emitted by the light source 602, the location of the light filter 604, and/or the presence of an agent in the vessel 606 configured to selectively label the dead cells. In one implementation for illustration, the light source 602 may be a broad spectrum light source, the imaging device 608 may be a monochrome imaging device, and the cells in the vessel 606 may be exposed to trypan blue. In this implementation, the light filter 604 may be positioned between the light source 602 and the vessel 606 and be configured to filter light between approximately 510 nanometers (nm) and approximately 650 nm (e.g., reduce the intensity of light between 510 nm and 650 nm and/or completely block light between 510 nm and 650 nm).

It should be appreciated that various alterations may be made to the imaging system 600A without departing from the scope of the present disclosure. For example, the light filter 604 may be placed between the vessel 606 and the imaging device 608 as shown in FIG. 6B by imaging system 600B instead of between the light source 602 and the vessel 606. Further, the imaging systems 600A and/or 600B may comprise additional elements that change a characteristic of light. For example, the imaging systems 600A and/or 600B may comprise one or more optical elements to magnify the cells in the vessel 606.

In some embodiments, the imaging systems 600A and/or 600B may enhance the contrast between live cells and dead cells in a captured image of a vessel without the light filter 604. For example, the light source 602 may be a narrow spectrum light source (e.g., a light source that emits light with a spectrum that is less than 350 nm in size, less than 300 nm in size, less than 250 nm in size, less than 200 nm in size, less than 150 nm in size, less than 100 nm in size, and/or less than 50 nm in size) that is configured to emit light with a similar spectrum as broad spectrum light that has passed through the light filter 604. For example, the light source 602 may be implemented as a yellow light emitting diode (LED) that is configured to emit yellow light as an alternative to implementing the light source 602 as a white LED that is configured to emit white light and filtering the white light with the filter 604 to produce yellow light. Thereby, the same contrast enhancement may be achieved without the light filter 604. It should be appreciated that narrow spectrum light may be generated by any of a variety of light sources such as colored LEDs (e.g., a yellow LED, a blue LED, a green LED, a red LED, etc.) and colored lasers (e.g., a yellow laser, a blue laser, a green laser, a red laser). In some embodiments, a yellow LED or yellow laser emits light within a wavelength range from 570 nm to 590 nm. In some embodiments, a blue LED or blue laser emits light within a wavelength range from 450 nm to 500 nm. In some embodiments, a green LED or green laser emits light within a wavelength range from 500 nm to 570 nm. In some embodiments, a red LED or red laser emits light within a wavelength range from 610 nm to 760 nm.

Figure 7:
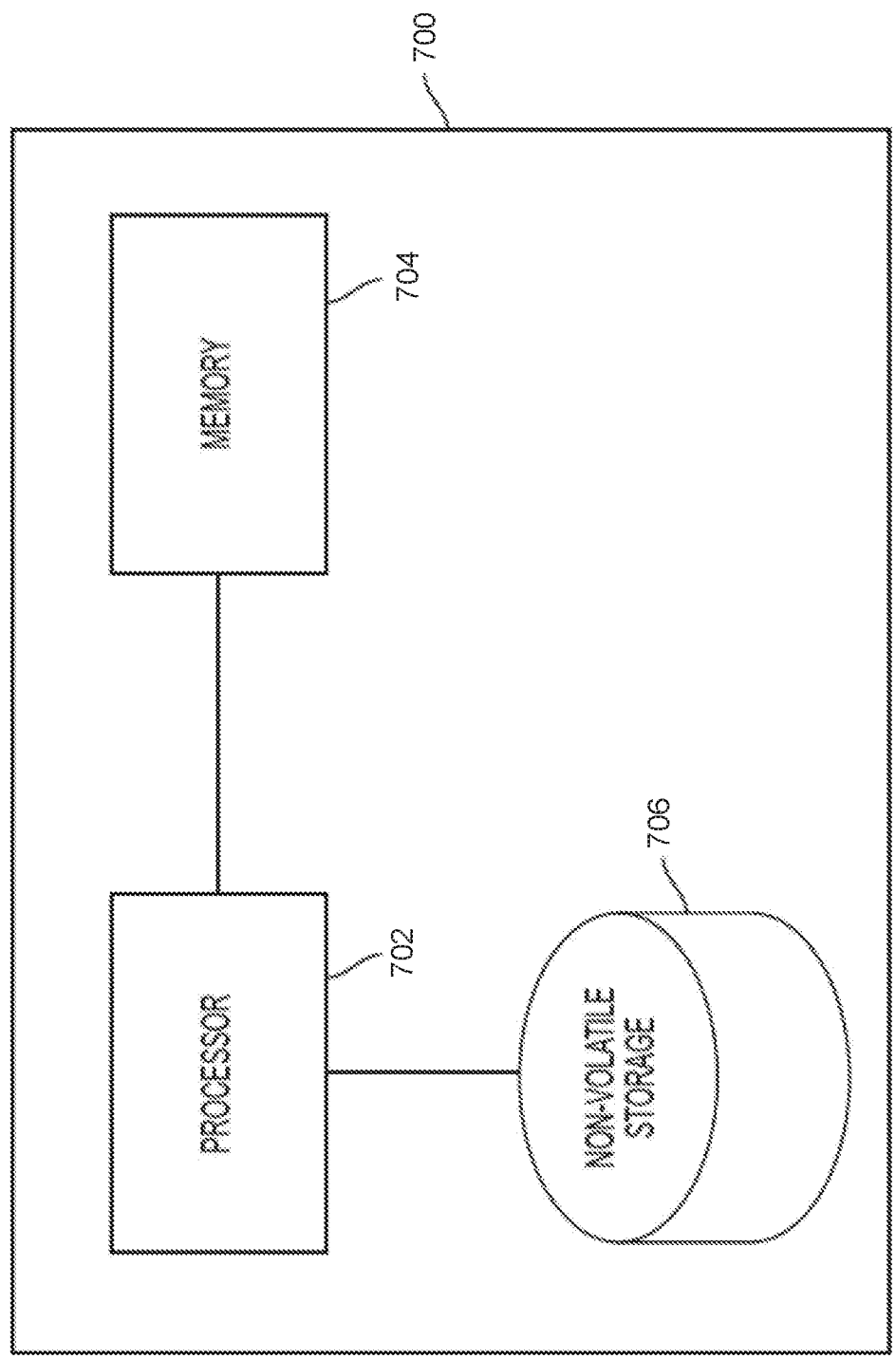
FIG. 7 is a diagram of an example controller, according to some embodiments of the technology described herein.

The controllers described above (e.g. controllers 412 and 506) may be implemented in any of a variety of ways. An illustrative implementation of a controller is shown in FIG. 7 by controller 700. As shown, the controller 700 may include one or more computer hardware processors 702 and one or more articles of manufacture that comprise non-transitory computer-readable storage media (e.g., memory 704 and one or more non-volatile storage devices 706).

The processor(s) 702 may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

It should be appreciated that various alterations may be made to the controller 700 without departing from the scope of the present document. In some embodiments, one or more components of the controller 700 shown in FIG. 7 may be separate from the controller 700 and communicatively coupled to the controller 700. For example, the memory 704 and/or one or more non-volatile storage devices 706 may be separate from the controller 700.

The terms "program" or "software" are used herein in a generic sense to refer to any type of computer code or set of processor-executable instructions that may be employed to program a computer or other processor to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more controllers or other devices. Generally, program modules include routines, programs, objects, components, data structures, etc. that perform particular tasks or implement particular abstract data types. Typically, the functionality of the program modules may be combined or distributed.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements);etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

The terms "approximately" and "about" may be used to mean within ±20% of a target dimension in some embodiments, within ±10% of a target dimension in some embodiments, within ±5% of a target dimension in some embodiments, and yet within ±2% of a target dimension in some embodiments. The terms "approximately" and "about" may include the target dimension.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system, comprising:
   an imaging system configured to produce a bright-field image of a plurality of cells in a vessel in a plurality of focal planes;
   at least one controller coupled to the imaging system; and
   the at least one controller coupled to memory containing instructions that when executed:

control the imaging system to capture a plurality of z-stack bright-field images of at least some cells, each of the plurality of z-stack images including two-dimensional x-y images, at different focal lengths, corresponding to focal planes at different z coordinates relative to the imaging system, to capture focused images of each of the at least some cells;

in each of the z-stack images, determine an area of at least one cell by separating a foreground of the image from a background of the image and producing a binary mask that indicates for each pixel whether it is in the foreground or background, wherein the pixels in the foreground correspond to a focused image of a cell, identifying objects in the foreground that have a size of at least one cell and identifying objects having a size greater than that of one cell as a cell cluster;

for each object determined to be a cell cluster, find at least one sharp peak in an intensity contour in the object image which corresponds to a center of a cell: and count the number of cells by counting the number of objects identified as single cells in all of the plurality of images and counting the number of peaks in the objects identified as a cell cluster in all of the plurality of images;

wherein counting the number of cells in a focused image further comprises:
identifying a plurality of obiects in the focused image;
classifying a first subset of the plurality of objects as live cells; and
counting a number of live cells in the first subset of the plurality of objects;

wherein counting the number of cells in the focused image further comprises:
classifying a second subset of the plurality of objects as dead cells; and
determining a number of dead cells in the second subset of the plurality of objects.

2. The system of claim 1, wherein the plurality of cells have been exposed to an agent that selectively labels dead cells.

3. The system of claim 2, wherein the agent comprises a stain that selectively colors the dead cells, wherein the imaging system comprises a light filter configured to filter at least some visible light.

4. The system of claim 3, wherein the bright-field imaging system comprises a monochrome imaging device and a light source configured to emit visible light, wherein the filter is disposed between the light source and the monochrome imaging device.

5. The system of claim 3, wherein the filter is configured to filter at least some visible light with a wavelength above 510 nanometers (nm).

6. The system of claim 3, wherein the filter is configured to filter at least some visible light with a wavelength below 650 nanometers (nm).

7. The system of claim 5, wherein the stain comprises trypan blue.

8. The system of claim 1, wherein identifying the area of the at least one cell by counting a number of pixels associated with the at least one cell.

9. The system of claim 8, wherein identifying the area of the at least one cell by estimating a length of an axis of the at least one cell.

10. The system of claim 1, further comprising, after producing the mask, reclassifying artifacts in the foreground as part of the background and/or reclassifying artifacts in the background as part of the foreground.

11. The system of claim 1, wherein separating the foreground of the z-stack image from the background of the z-stack image comprises thresholding the z-stack image.

12. The system of claim 1, wherein determining the number of cells in the focused image comprises classifying a second subset of the plurality of objects as debris.

13. The system of claim 1, wherein classifying the first subset of the plurality of objects as live cells comprises: classifying a first object from the first subset of the plurality of objects as a single live cell; classifying a second object from the first subset of the plurality of objects as a cluster of live cells; and
determining a number of live cells in the second object based on an intensity contour associated with the second object.

14. A method, comprising:
receiving a plurality of cells in a vessel;
capturing a focused bright-field image of at least some cells in the plurality of cells, wherein capturing the focused image comprises:
capturing, using the imaging system, a plurality of z-stack images of the at least some cells, each of the plurality of z-stack images including two- dimensional x-y images, at different focal lengths, corresponding to focal planes at different z coordinates relative to the imaging system, to capture focused images of each of the at least some cells;
in each of the z-stack images, determining, using at least one controller, an area of at least one cell in each of the z-stack images by separating a foreground of the image from a background of the image and producing a binary mask that indicates for each pixel whether it is in the foreground or background, wherein the pixels in the foreground correspond to a focused image of a cell, identifying objects in the foreground that have a size of at least one cell and identifying an object that has a size greater than that of one cell as a cell cluster;
for each object determined to be a cell cluster, finding at least one sharp peak in an intensity contour in the object image which corresponds to a center of a cell; and
counting the number of cells by counting the number of objects identified as single cells in all of the plurality of images and counting the number of peaks in the objects identified as a cell cluster in all of the plurality of images;
wherein counting the number of cells in the focused image comprises:
identifying a plurality of objects in the focused image;
classifying a first subset of the plurality of objects as live cells; and
counting the number of live cells in the first subset of the plurality of objects
wherein classifying the first subset of the plurality of objects as live cells comprises:
classifying a first object from the first subset of the plurality of objects as a single live cell;
classifying a second object from the first subset of the plurality of objects as a cluster of live cells; and
determining the number of live cells in the second object based on an intensity contour associated with the second object.

15. The method of claim 14, wherein identifying the plurality of objects comprises: separating a foreground of the focused image from a background of the focused image; and identifying at least one portion in the foreground of the focused image as an object.

16. The method of claim 14, wherein determining the number of cells in the at least some cells comprises classifying a second subset of the plurality of objects as debris.

\* \* \* \* \*